(12) United States Patent
Schuster et al.

(10) Patent No.: US 11,693,862 B2
(45) Date of Patent: Jul. 4, 2023

(54) EFFICIENT ADAPTIVE DETECTION OF COMPLEX EVENT PATTERNS

(71) Applicant: TECHNION RESEARCH & DEVELOPMENT FOUNDATION LIMITED, Haifa (IL)

(72) Inventors: Assaf Schuster, Haifa (IL); Ilya Kolchinsky, Ashdod (IL)

(73) Assignee: TECHNION RESEARCH & DEVELOPMENT FOUNDATION LIMITED, Haifa (IL)

(*) Notice: Subject to any disclaimer, the term of this patent is extended or adjusted under 35 U.S.C. 154(b) by 317 days.

(21) Appl. No.: 17/289,625

(22) PCT Filed: Oct. 29, 2019

(86) PCT No.: PCT/IL2019/051171
§ 371 (c)(1),
(2) Date: Apr. 28, 2021

(87) PCT Pub. No.: WO2020/089898
PCT Pub. Date: May 7, 2020

(65) Prior Publication Data
US 2021/0397622 A1     Dec. 23, 2021

Related U.S. Application Data

(60) Provisional application No. 62/751,817, filed on Oct. 29, 2018.

(51) Int. Cl.
*G06F 16/245* (2019.01)
*G06F 16/2455* (2019.01)
(Continued)

(52) U.S. Cl.
CPC .... *G06F 16/24568* (2019.01); *G06F 11/3409* (2013.01); *G06F 16/2358* (2019.01);
(Continued)

(58) Field of Classification Search
CPC ......... G06F 16/24568; G06F 16/24542; G06F 16/24565; G06F 16/2358; G06F 11/3409; G06N 5/01
See application file for complete search history.

(56) References Cited

U.S. PATENT DOCUMENTS

| 2009/0106701 | A1* | 4/2009 | Yalamanchi | ............ G06F 16/26 715/841 |
| 2017/0046209 | A1 | 2/2017 | Ye et al. | |
| 2017/0060947 | A1 | 3/2017 | Zhang et al. | |

OTHER PUBLICATIONS

I. Kolchinsky and A. Schuster (2018). Efficient adaptive detection of complex event patterns. Proc. VLDB Endow. 11, 11 (Jul. 2018), 1346-1359. https://doi.org/10.14778/3236187.3236190.
(Continued)

*Primary Examiner* — Truong V Vo
(74) *Attorney, Agent, or Firm* — The Roy Gross Law Firm, LLC; Roy Gross

(57) ABSTRACT

A method comprising receiving, as input, a data stream representing events; receiving a complex event pattern (CEP) specification representing an occurrence of a CEP in said data stream based on a set of conditions and set of event attributes; applying an algorithm to generate a current CEP plan configured to determine said occurrence of said CEP, wherein said current CEP plan comprises of a series of execution steps; optimize said current CEP plan by, iteratively: (i) executing said current CEP plan, (ii) identifying, with respect to each of said execution steps, one of said conditions whose verification causes said execution step to be included in said current CEP plan, and (iii) performing a re-verification of all of said identified conditions using said updated current values; and re-applying said algorithm when said re-verification fails with respect to at least one of said identified conditions, to generate an updated CEP plan.

18 Claims, 18 Drawing Sheets

(51) Int. Cl.
    G06F 16/2453    (2019.01)
    G06F 16/23      (2019.01)
    G06F 11/34      (2006.01)
    G06N 5/01       (2023.01)
(52) U.S. Cl.
    CPC .. *G06F 16/24542* (2019.01); *G06F 16/24565* (2019.01); *G06N 5/01* (2023.01)

(56) References Cited

OTHER PUBLICATIONS

D. J. Abadi, Y. Ahmad, M. Balazinska, M. Cherniack, J. Hwang, W. Lindner, A. S. Maskey, E. Rasin, E. Ryvkina, N. Tatbul, Y. Xing, and S. Zdonik. The design of the Borealis stream processing engine. 2nd Biennial Conference on Innovative Data Systems Research, CIDR 2005. 5. 277-289.
M. Acosta, M. Vidal, T. Lampo, J. Castillo, and E. Ruckhaus. NAPSID: An Adaptive Query Processing Engine for SPARQL Endpoints. In:, et al. The Semantic Web—ISWC 2011. ISWC 2011. Lecture Notes in Computer Science, vol. 7031. Springer, Berlin, Heidelberg. https://doi.org/10.1007/978-3-642-25073-6_2.
Adi, A. & Etzion, O. (2004). Amit—The situation manager. VLDB, 13, 177-203. doi: 10.1007/s00778-003-0108-y.
J. Agrawal, Y. Diao, D. Gyllstrom, and N. Immerman. 2008. Efficient pattern matching over event streams. In Proceedings of the 2008 ACM SIGMOD international conference on Management of data (SIGMOD '08). Association for Computing Machinery, New York, NY, USA, 147-160. https://doi.org/10.1145/1376616.1376634.
M. Akdere, U. Çetintemel, and N. Tatbul. 2008. Plan-based complex event detection across distributed sources. Proc. VLDB Endow. 1,1 (Aug. 2008), 66-77. https://doi.org/10.14778/1453856.1453869.
M. Ali, F. Gao, and A. Mileo. CityBench: A configurable benchmark to evaluate RSP engines using smart city datasets. In Proceedings of ISWC 2015—14th International Semantic Web Conference, pp. 374-389, Bethlehem, PA, USA, 2015. W3C. doi: 10.1007/978-3-319-25010-6_25.
A. Aly, W. Aref, M. Ouzzani, and H. Mahmoud. JISC: adaptive stream processing using just-in-time state completion. In Proceedings of the 17th International Conference on Extending Database Technology, Athens, Greece, Mar. 24-28, 2014., pp. 73-84. DOI:10.5441/002/edbt.2014.08.
L. Amini, H. Andrade, R. Bhagwan, F. Eskesen, R. King, P. Selo, Y. Park, and C. Venkatramani. 2006. SPC: a distributed, scalable platform for data mining. In Proceedings of the 4th international workshop on Data mining standards, services and platforms (DMSSP '06). Association for Computing Machinery, New York, NY, USA, 27-37. https://doi.org/10.1145/1289612.1289615.
Arasu, A., Babcock, B., Babu, S., Cieslewicz, J., Datar, M., Ito, K., Motwani, R., Srivastava, U., & Widom, J. (2016). STREAM: The Stanford Data Stream Management System. In: Garofalakis, M., Gehrke, J., Rastogi, R. (eds) Data Stream Management. Data-Centric Systems and Applications. Springer, Berlin, Heidelberg. https://doi.org/10.1007/978-3-540-28608-0_16.
R. Avnur and J. Hellerstein. Eddies: Continuously adaptive query processing. SIGMOD Rec., 29(2):261-272, May 2000. https://doi.org/10.1145/335191.335420.
B. Babcock, M. Datar, R. Motwani, and L. O'Callaghan. 2003. Maintaining variance and k-medians over data stream windows. In Proceedings of the twenty-second ACM SIGMOD-SIGACT-SIGART symposium on Principles of database systems (PODS '03). Association for Computing Machinery, New York, NY, USA, 234-243. https://doi.org/10.1145/773153.773176.
S. Babu, P. Bizarro, and D. DeWitt. 2005. Proactive re-optimization. In Proceedings of the 2005 ACM SIGMOD International conference on Management of data (SIGMOD '05). Association for Computing Machinery, New York, NY, USA, 107-118. https://doi.org/10.1145/1066157.1066171.
S. Babu, R. Motwani, K. Munagala, I. Nishizawa, and J. Widom. Adaptive ordering of pipelined stream filters. In Proceedings of the 2004 ACM SIGMOD International Conference on Management of Data, pp. 407-418, New York, NY, USA, 2004. ACM.
S. Babu and J. Widom. StreaMon: An adaptive engine for stream query processing. In Proceedings of the 2004 ACM SIGMOD International Conference on Management of Data, pp. 931-932, New York, NY, USA, 2004. ACM.
R. S. Barga, J. Goldstein, M. H. Ali, and M. Hong. Consistent streaming through time: A vision for event stream processing. In CIDR, pp. 363-374, 2007.
P. Bizarro, S. Babu, D. J. DeWitt, and J. Widom. Content-based routing: Different plans for different data. In Proceedings of the 31st International Conference on Very Large Data Bases, Trondheim, Norway, Aug. 30-Sep. 2, 2005, pp. 757-768. ACM, 2005.
Chandramouli, Badrish & Goldstein, Jonathan & Maier, David. (2010). High-Performance Dynamic Pattern Matching over Disordered Streams. Proceedings of the VLDB Endowment vol. 3, Issue 1-2, pp. 220-231, https://doi.org/10.14778/1920841.1920873.
S. Chandrasekaran, O. Cooper, A. Deshpande, M. J. Franklin, J. M. Hellerstein, W. Hong, S. Krishnamurthy, S. Madden, V. Raman, F. Reiss, and M. A. Shah. (2003).Telegraphcq: Continuous dataflow processing for an uncertain world. In Proceedings of the 2003 CIDR Conference, CIDR, ACM.
Jianjun Chen, David J. DeWitt, Feng Tian, and Yuan Wang. 2000. NiagaraCQ: a scalable continuous query system for Internet databases. SIGMOD Rec. 29, 2 (Jun. 2000), 379-390. https://doi.org/10.1145/335191.335432.
Coffi, JR., Marsala, C. & Museux, N. Adaptive complex event processing for harmful situation detection. Evolving Systems 3, 167-177 (2012). https://doi.org/10.1007/s12530-012-9052-7.
Gianpaolo Cugola and Alessandro Margara. 2010. Tesla: a formally defined event specification language. In Proceedings of the Fourth ACM International Conference on Distributed Event-Based Systems (DEBS '10). Association for Computing Machinery, New York, NY, USA, 50-61. https://doi.org/10.1145/1827418.1827427.
Gianpaolo Cugola and Alessandro Margara. 2012. Complex event processing with T-Rex. J. Syst. Softw. 85, 8 (Aug. 2012), 1709-1728. https://doi.org/10.1016/j.jss.2012.03.056.
Gianpaolo Cugola and Alessandro Margara. 2012. Processing flows of information: From data stream to complex event processing. ACM Comput. Surv. 44, 3, Article 15 (Jun. 2012), 62 pages. https://doi.org/10.1145/2187671.2187677.
M. Datar, A. Gionis, P. Indyk, and R. Motwani. Maintaining stream statistics over sliding windows. SIAM J. Comput., 31(6):1794-1813, Jun. 2002.
Alan Demers, Johannes Gehrke, Mingsheng Hong, Mirek Riedewald, and Walker White. 2006. Towards expressive publish/subscribe systems. In Proceedings of the 10th international conference on Advances in Database Technology (EDBT'06). Springer-Verlag, Berlin, Heidelberg, 627-644. https://doi.org/10.1007/11687238_38.
Deshpande, Amol & Ives, Zachary & Raman, Vijayshankar. (2007). Adaptive Query Processing. Foundations and Trends In Databases. 1 (1), 1-140. doi: 10.1561/1900000001.
O. Etzion and P. Niblett. Event Processing in Action. Manning Publications Co., Greenwich, CT, United States, 2010.
I. Flouris, N. Giatrakos, A. Deligiannakis, M. Garofalakis, M. Kamp, and M. Mock. Issues in complex event processing: Status and prospects in the big data era. Journal of Systems and Software, 127:217-236, 2017. https://doi.org/10.1016/j.jss.2016.06.011.
Zachary G. Ives, Alon Y. Halevy, and Daniel S. Weld. 2004. Adapting to source properties in processing data integration queries. In Proceedings of the 2004 ACM SIGMOD international conference on Management of data (SIGMOD '04). Association for Computing Machinery, New York, NY, USA, 395-406. https://doi.org/10.1145/1007568.1007613.
Navin Kabra and David J. DeWitt. 1998. Efficient mid-query re-optimization of sub-optimal query execution plans. SIGMOD Rec. 27, 2 (Jun. 1998), 106-117. https://doi.org/10.1145/276305.276315.
Kolchinsky, I., Schuster, A., & Keren, D. (2016). Efficient Detection of Complex Event Patterns Using Lazy Chain Automata. ArXiv, abs/1612.05110.

(56) References Cited

OTHER PUBLICATIONS

Ilya Kolchinsky and Assaf Schuster. 2018. Join query optimization techniques for complex event processing applications. Proc VLDB Endow. 11, 11 (Jul. 2018), 1332-1345. https://doi.org/10.14778/3236187.3236189.

Ilya Kolchinsky, Izchak Sharfman, and Assaf Schuster. 2015. Lazy evaluation methods for detecting complex events. In Proceedings of the 9th ACM International Conference on Distributed Event-Based Systems (DEBS '15). Association for Computing Machinery, New York, NY, USA, 34-45. https://doi.org/10.1145/2675743.2771832.

Krämer, J., Yang, Y., Cammert, M., Seeger, B., Papadias, D. (2006). Dynamic Plan Migration for Snapshot-Equivalent Continuous Queries in Data Stream Systems. In:, et al. Current Trends in Database Technology—EDBT 2006. EDBT 2006. Lecture Notes in Computer Science, vol. 4254. Springer, Berlin, Heidelberg. https://doi.org/10.1007/11896548_38.

Lee, OJ., You, E., Hong, MS., Jung, J.J. (2015). Adaptive Complex Event Processing Based on Collaborative Rule Mining Engine. In: Nguyen, N., Trawiński, B., Kosala, R. (eds) Intelligent Information and Database Systems. ACIIDS 2015. Lecture Notes in Computer Science(), vol. 9011. Springer, Cham. https://doi.org/10.1007/978-3-319-15702-3_42.

Mengmeng Liu, Zachary G. Ives, and Boon Thau Loo. 2016. Enabling Incremental Query Re-Optimization. In Proceedings of the 2016 International Conference on Management of Data (SIGMOD '16). Association for Computing Machinery, New York, NY, USA, 1705-1720. https://doi.org/10.1145/2882903.2915212.

Samuel Madden, Mehul Shah, Joseph M. Hellerstein, and Vijayshankar Raman. 2002. Continuously adaptive continuous queries over streams. In Proceedings of the 2002 ACM SIGMOD international conference on Management of data (SIGMOD '02). Association for Computing Machinery, New York, NY, USA, 49-60. https://doi.org/10.1145/564691.564698.

Volker Markl, Vijayshankar Raman, David Simmen, Guy Lohman, Hamid Pirahesh, and Miso Cilimdzic. 2004. Robust query processing through progressive optimization. In Proceedings of the 2004 ACM SIGMOD international conference on Management of data (SIGMOD '04). Association for Computing Machinery, New York, NY, USA, 659-370. https://doi.org/10.1145/1007568.1007642.

Yuan Mei and Samuel Madden. 2009. ZStream: a cost-based query processor for adaptively detecting composite events. In Proceedings of the 2009 ACM SIGMOD International Conference on Management of data (SIGMOD '09). Association for Computing Machinery, New York, NY, USA, 193-206. https://doi.org/10.1145/1559845.1559867.

Nehme, R.V., Works, K., Lei, C., Rundensteiner, E.A., & Bertino, E. (2013). Multi-route query processing and optimization. Journal of Computer and System Sciences, 79(3), 312-329. https://doi.org/10.1016/j.jcss.2012.09.010.

M. Sadoghi and H. Jacobsen. Adaptive parallel compressed event matching. In IEEE 30th International Conference on Data Engineering, Chicago, IL, USA, 2014, pp. 364-375, doi: 10.1109/ICDE.2014.6816665.

Nicholas Poul Schultz-Møller, Matteo Migliavacca, and Peter Pietzuch. 2009. Distributed complex event processing with query rewriting. In Proceedings of the Third ACM International Conference on Distributed Event-Based Systems (DEBS '09). Association for Computing Machinery, New York, NY, USA, Article 4, 1-12. https://doi.org/10.1145/1619258.1619264.

M. Stillger, G. Lohman, V. Markl, and M. Kandil. LEO—DB2's LEarning optimizer. In Proceedings of the 27th International Conference on Very Large Data Bases, pp. 19-28, San Francisco, CA, USA, 2001. Morgan Kaufmann Publishers Inc.

Swami, Arun. (1989). Optimization of large join queries: Combining heuristics and combinatorial techniques. ACM SIGMOD Record. 18. 367-376. 10.1145/67544.66961.

Nesime Tatbul, Uğur Çetintemel, Stan Zdonik, Mitch Cherniack, and Michael Stonebraker. 2003. Load shedding in a data stream manager. In Proceedings of the 29th international conference on Very large data bases—vol. 29 (VLDB '03). VLDB Endowment, 309-320.

Eugene Wu, Yanlei Diao, and Shariq Rizvi. 2006. High-performance complex event processing over streams. In Proceedings of the 2006 ACM SIGMOD international conference on Management of data (SIGMOD '06). Association for Computing Machinery, New York, NY, USA, 407-418. https://doi.org/10.1145/1142473.1142520.

Yi, I., Lee, J., & Whang, K. (2016). APAM: Adaptive Eager-Lazy Hybrid Evaluation of Event Patterns for Low Latency. Proceedings of the 25th ACM International on Conference on Information and Knowledge Management. DOI: http://dx.doi.org/10.1145/2983323.2983680.

Haopeng Zhang, Yanlei Diao, and Neil Immerman. 2014. On complexity and optimization of expensive queries in complex event processing. In Proceedings of the 2014 ACM SIGMOD International Conference on Management of Data (SIGMOD '14). Association for Computing Machinery, New York, NY, USA, 217-228. https://doi.org/10.1145/2588555.2593671.

Yali Zhu, Elke A. Rundensteiner, and George T. Heineman. 2004. Dynamic plan migration for continuous queries over data streams. In Proceedings of the 2004 ACM SIGMOD international conference on Management of data (SIGMOD 04). Association for Computing Machinery, New York, NY, USA, 431-442. https://doi.org/10.1145/1007568.1007617.

Eoddata. (2022). End of Day Stock Quote Data and Historical Stock Prices. Retrieved Sep. 18, 2022, from https://www.eoddata.com/.

Espertech. (Apr. 12, 2022). Complex Event Processing, Streaming Analytics, Streaming SQL. EsperTech. Retrieved Sep. 18, 2022, from https://www.espertech.com/.

Aarts, E. and Lenstra, J., Local Search in Combinatorial Optimization, 1997, 1st edition, John Wiley & Sons, Inc., New, York, NY.

PCT International Search Report for International Application No. PCT/IL2019/051171, dated Feb. 18, 2020, 3pp.

PCT Written Opinion for International Application No. PCT/IL2019/051171, dated Feb. 18, 2020, 6pp.

PCT International Preliminary Report on Patentability for International Application No. PCT/IL2019/051171, dated Apr. 27, 2021, 7pp.

* cited by examiner

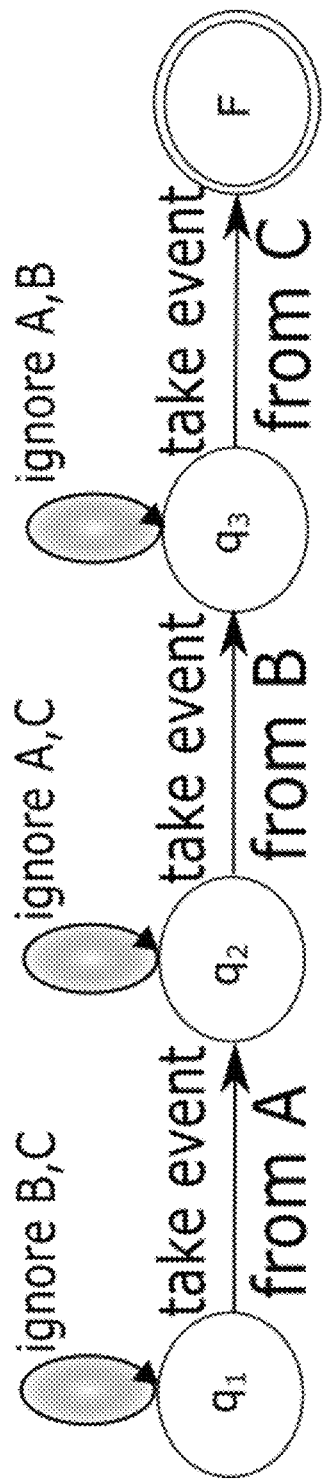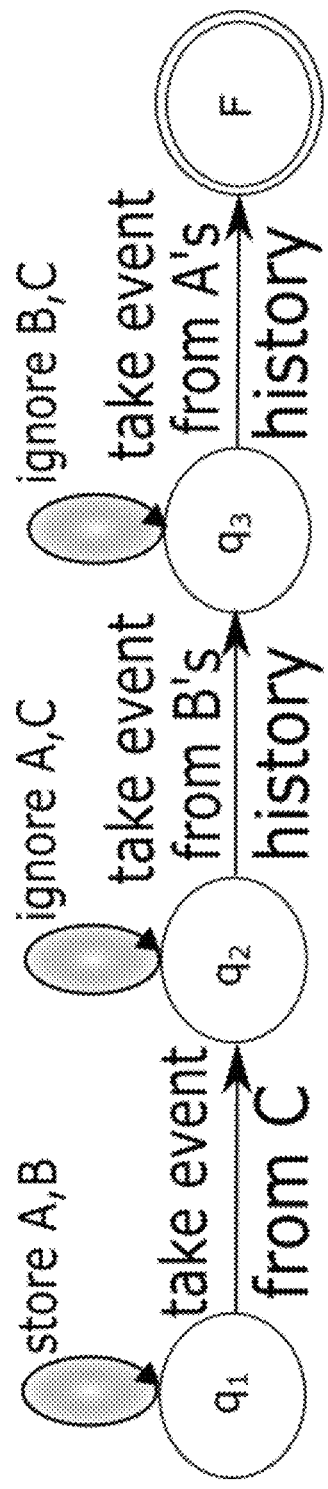
FIG. 1A
FIG. 1B

EFFICIENT ADAPTIVE DETECTION OF COMPLEX EVENT PATTERNS

CROSS REFERENCE TO RELATED APPLICATIONS

This application is a National Phase of PCT Patent Application No. PCT/IL2019/051171 having International filing date of Oct. 29, 2019, which claims the benefit of priority of U.S. Provisional Patent Application No. 62/751,817, filed Oct. 29, 2018, the contents of which are all incorporated herein by reference in their entirety.

BACKGROUND

This invention relates to the field of computerized complex event processing.

Complex event processing (CEP) is widely employed to detect occurrences of predefined combinations (patterns) of events in massive data streams. As new events are accepted, they are matched using some type of evaluation structure, commonly optimized according to the statistical properties of the data items in the input stream. However, in many real-life scenarios the data characteristics are never known in advance or are subject to frequent on-the-fly changes. To modify the evaluation structure as a reaction to such changes, adaptation mechanisms are employed. These mechanisms typically function by monitoring a set of properties and applying a new evaluation plan when significant deviation from the initial values is observed. This strategy often leads to missing important input changes or it may incur substantial computational overhead by over-adapting.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: receiving, as input, a data stream representing events; receiving a complex event pattern (CEP) specification representing an occurrence of a CEP in said data stream, wherein said CEP specification comprises (a) a set of conditions associated with relations among said events, and (b) a set of attributes associated with said events; continuously updating, from said data stream, current values associated with said set of attributes; applying an algorithm to generate, based on said CEP specification and said current values, a current CEP plan configured to determine said occurrence of said CEP in said data stream, wherein said current CEP plan comprises of a series of execution steps; and optimizing said current CEP plan by, iteratively (i) executing said current CEP plan, (ii) identifying, with respect to each of said execution steps, one of said conditions as an invariant condition whose verification causes said execution step to be included in said current CEP plan, (iii) performing a re-verification of all of said invariant conditions using said updated current values; and (iv) re-applying said algorithm when said re-verification fails with respect to at least one of said invariant conditions, to generate an updated CEP plan.

There is also provide, in an embodiment, a system comprising: at least one hardware processor; and a non-transitory computer-readable storage medium having stored thereon program code, the program code executable by the at least one hardware processor to: receive, as input, a data stream representing events, receive a complex event pattern (CEP) specification representing an occurrence of a CEP in said data stream, wherein said CEP specification comprises (a) a set of conditions associated with relations among said events, and (b) a set of attributes associated with said events, continuously update, from said data stream, current values associated with said set of attributes, apply an algorithm to generate, based on said CEP specification and said current values, a current CEP plan configured to determine said occurrence of said CEP in said data stream, wherein said current CEP plan comprises of a series of execution steps, and optimize said current CEP plan by, iteratively: (i) executing said current CEP plan, (ii) identifying, with respect to each of said execution steps, one of said conditions as an invariant condition whose verification causes said execution step to be included in said current CEP plan, (iii) performing a re-verification of all of said invariant conditions using said updated current values; and (iv) re-applying said algorithm when said re-verification fails with respect to at least one of said invariant conditions, to generate an updated CEP plan.

There is further provided, in an embodiment, a computer program product comprising a non-transitory computer-readable storage medium having program code embodied therewith, the program code executable by at least one hardware processor to: receive, as input, a data stream representing events, receive a complex event pattern (CEP) specification representing an occurrence of a CEP in said data stream, wherein said CEP specification comprises (a) a set of conditions associated with relations among said events, and (b) a set of attributes associated with said events, continuously update, from said data stream, current values associated with said set of attributes, apply an algorithm to generate, based on said CEP specification and said current values, a current CEP plan configured to determine said occurrence of said CEP in said data stream, wherein said current CEP plan comprises of a series of execution steps, and optimize said current CEP plan by, iteratively: (i) executing said current CEP plan, (ii) identifying, with respect to each of said execution steps, one of said conditions as an invariant condition whose verification causes said execution step to be included in said current CEP plan, (iii) performing a re-verification of all of said invariant conditions using said updated current values; and (iv) re-applying said algorithm when said re-verification fails with respect to at least one of said invariant conditions, to generate an updated CEP plan.

In some embodiments, the set of conditions is selected from the group consisting of: a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, and an occurrence of an aggregation of a set of event.

In some embodiments, the CEP is selected from the group consisting of: an occurrence of a single event, an occurrence of a single event under a single condition, an occurrence of multiple events under a single condition, and an occurrence of multiple events under multiple conditions.

In some embodiments, method further comprises configuring, and the program instructions are further executable to configure, a CEP engine to initiate an action in response to said determining of said occurrence of said CEP.

In some embodiments, the identifying, with respect to each of said execution steps, comprises: (i) identifying a set of all of said conditions whose verification causes said execution step to be included in said current CEP plan; and (ii) selecting, from said set, the most tightly bounded condition as said invariant condition.

In some embodiments, the algorithm is one of a greedy heuristic algorithm and a ZStream algorithm.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-1B show an example of an evaluation mechanism (a non-deterministic finite automaton) for detecting this simple pattern by a CEP engine are a block diagram of an exemplary system, in accordance with some embodiments of the present invention;

DETAILED DESCRIPTION

Figure 2:
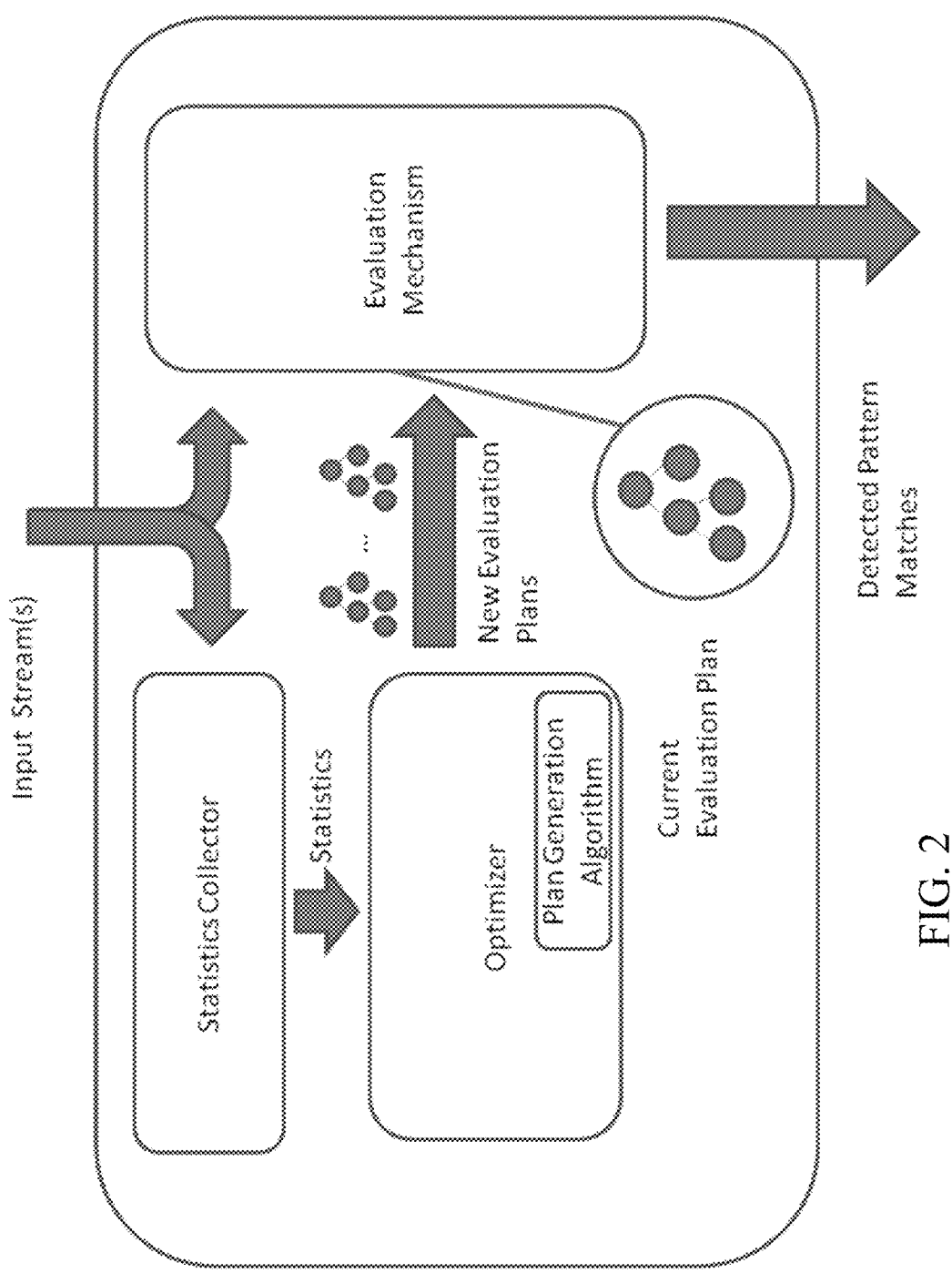
FIG. 2 shows a common structure of an ACEP system.

Disclosed herein are a system, method and computer program product for efficient and precise dynamic determination of whether and how an evaluation structure should be reoptimized in the context of real-time detection of complex events.

In some embodiments, the present method is based on a small set of constraints to be satisfied by the monitored values, defined such that a better evaluation plan is guaranteed if any of the constraints is violated.

In some embodiments, the present method thus provably avoids false positives on re-optimization decisions. In some embodiments, the present method can be applied to known algorithms for evaluation plan generation.

Real-time detection of complex data patterns is one of the fundamental tasks in stream processing. Many modern applications present a requirement for tracking data items arriving from multiple input streams and extracting occurrences of their predefined combinations. Complex event processing (CEP) is a prominent technology for providing this functionality, broadly employed in a wide range of domains, including sensor networks, security monitoring and financial services. CEP engines represent data items as events arriving from event sources. As new events are accepted, they are combined into higher-level complex events matching the specified patterns, which are then reported to end users.

One of the core elements of a CEP system is the evaluation mechanism. Popular evaluation mechanisms include non-deterministic finite automata (NFAs) [Reference 48], evaluation trees [Reference 41], graphs [Reference 6] and event processing networks (EPNs) [Reference 28]. A CEP engine uses an evaluation mechanism to create an internal representation for each pattern P to be monitored. This representation is constructed according to the evaluation plan, which reflects the structure of P. The evaluation plan defines how primitive events are combined into partial matches. Typically, a separate instance of the internal representation is created at runtime for every potential pattern match (i.e., a combination of events forming a valid subset of a full match).

With reference to FIGS. 1A-1B, consider the following scenario: A system for managing an array of smart security cameras A, B, C is installed in a building. All cameras are equipped with face recognition software, and periodical readings from each camera are sent in real time to the main server. A detection objective is a scenario in which an intruder accesses the restricted area via the main gate of the building rather than from the dedicated entrance. This pattern can be represented as a sequence of three primitive events:

camera A (installed near the main gate) detects a person;
later, camera B (located inside the building's lobby) detects the same person;
finally, camera C detects the same person in the restricted area.

FIG. 1A demonstrates an example of an evaluation mechanism (a non-deterministic finite automaton) for detecting this simple pattern by a CEP engine. This NFA is created according to the following simple evaluation plan. First, a stream of events arriving from camera A is inspected. For each accepted event, the stream of B is probed for subsequently received events specifying the same person. If found, the algorithm waits for a corresponding event to arrive from camera C.

Pattern detection performance can often be dramatically improved if the statistical characteristics of the monitored data are taken into account. In the example above, it can be assumed that fewer people access the restricted area than pass through the main building entrance. Consequently, the expected number of face recognition notifications arriving from camera C is significantly smaller than the expected number of similar events from cameras A and B. Thus, instead of detecting the pattern in the order of the requested occurrence of the primitive events (i.e., A>>B>>C), it would be beneficial to employ the "lazy evaluation" principle [Reference 35] and process the events in a different order, first monitoring the stream of events from C, and then examining the local history for previous readings of B and A. This way, fewer partial matches would be created. FIG. 1B depicts the NFA constructed according to the improved plan.

Numerous methods were proposed for defining evaluation plans based on the statistical properties of the data, such as event arrival rates [References 6, 35, 41, 44]. It was shown that systems tuned according to the a-priori knowledge of these statistics can boost performance by up to several orders of magnitude, especially for highly skewed data.

Unfortunately, in real-life scenarios, this a-priori knowledge is rarely obtained in advance. Moreover, the data characteristics can change rapidly over time, which may render an initial evaluation plan extremely inefficient. In Example 1, the number of people near the main entrance might drop dramatically in late evening hours, making the event stream from camera A the first in the plan, as opposed to the event stream from C.

To overcome this problem, a CEP engine must continuously estimate the current values of the target parameters and, if and whenever necessary, adapt itself to the changed data characteristics. These systems possessing such capabilities may be denoted as Adaptive CEP (ACEP) systems.

A common structure of an ACEP system is depicted in FIG. 2. The evaluation mechanism starts processing incoming events using some initial plan. A dedicated component calculates up-to-date estimates of the statistics (e.g., event arrival rates in Example 1) and transfers them to the optimizer. The optimizer then uses these values to decide whether the evaluation plan should be updated. If the answer is positive, a plan generation algorithm is invoked to produce a new plan (e.g., a new NFA), which is then delivered to the evaluation mechanism to replace the previously employed structure. In Example 1, this algorithm simply sorts the event types in the ascending order of their arrival rates and returns a chain-structured NFA conforming to that order.

Correct decisions by the optimizer are crucial for the successful operation of an adaptation mechanism. As the process of creating and deploying a new evaluation plan is very expensive, one would like to avoid "false positives," that is, launching re-optimizations that do not improve the currently employed plan. "False negatives," occurring when an important shift in estimated data properties is missed, are equally undesirable. A flawed decision policy may severely diminish or even completely eliminate the gain achieved by an adaptation mechanism.

The problem of designing efficient and reliable algorithms for re-optimization decision making has been well studied in areas such as traditional query optimization [Reference 27]. However, it has received only limited attention in the CEP domain ([References 35, 41]). In [Reference 35], the authors present a structure which reorganizes itself according to the currently observed arrival rates of the primitive events. Similarly to Eddies [Reference 11], this system does not adopt a single plan to maintain, but rather generates a new plan for each newly observed set of events regardless of the performance of the current one. The main strength of this method is that it is guaranteed to produce the optimal evaluation plan for any given set of events. However, it can create substantial bottlenecks due to the computational overhead of the plan generation algorithm. This is especially evident for stable event streams with little to no data variance, for which this technique would be outperformed by a non-adaptive solution using a static plan.

The second approach, introduced in [Reference 41], defines a constant threshold t for all monitored statistics. When any statistic deviates from its initially observed value by more than t, plan reconstruction is activated. This solution is much cheaper computationally than the previous one. However, some re-optimization opportunities may be missed.

Consider Example 1 again. Recall that the objective is to detect the events by the ascending order of their arrival rates, and let the rates for events generated by cameras A, B and C be $rate_A=100$, $rate_B=15$, $rate_C=10$, respectively. Obviously, events originating at A are significantly less sensitive to changes than those originating at B and C. Thus, if the statistics are monitored with a threshold t>6, a growth in C to the point where it exceeds B will not be discovered, even though the re-optimization is vital in this case. Alternatively, setting a value t<6 will result in detection of the above change, but will also cause the system to react to fluctuations in the arrival rate of A, leading to redundant plan re-computations.

No single threshold in the presented scenario can ensure optimal operation. However, by removing the conditions involving t and monitoring instead a pair of constraints $\{rate_A > rate_B, rate_B > rate_C\}$, plan re-computation would be guaranteed if and only if a better plan becomes available.

This paper presents a novel method for making efficient and precise on-the-fly adaptation decisions. The present method is based on defining a tightly bounded set of conditions on the monitored statistics to be periodically verified at runtime. These conditions, referred to in the present disclosure as 'invariants,' are generated during the initial plan creation, and are constantly recomputed as the system adapts to changes in the input. The invariants are constructed to ensure that a violation of at least one of them guarantees that a better evaluation plan is available.

Accordingly, in some embodiments, the present disclosure provides for a mechanism which provably avoid false positives on re-optimization decisions, while achieving notably low numbers of false negatives as compared to existing alternatives, as shown by empirical results. The present method can be applied to any deterministic algorithm for evaluation plan generation and used in any stream processing scenario.

In some embodiments, the present disclosure formally defines the reoptimizing decision problem for the complex event processing domain; presents a novel method for detecting re-optimization opportunities in ACEP systems by verifying a set of invariants on the monitored data characteristics and formally prove that no false positives are possible when this method is used; and extends the basic method to achieve a balance between computational efficiency and precision. In some embodiments, the present disclosure further demonstrates how to apply the invariant-based method on two known algorithms for evaluation structure creation, the greedy order-based algorithm [Reference 34] and ZStream algorithm [Reference 41], and discuss the generalization of these approaches to broader categories of algorithms (Section 4). Extensive experimental evaluations comparing the invariant-based method to existing state-of-the-art solutions, as performed on two real-world datasets, show that the present method achieves the highest accuracy and the lowest computational overhead.

Notations and Terminology

A pattern recognized by a CEP system is defined by a combination of primitive events, operators, predicates, and a time window. The patterns are formed using declarative specification languages ([References 22, 26, 48]).

Each event is represented by a type and a set of attributes, including the occurrence timestamp. Throughout this paper it is assumed that each primitive event has a well-defined type, i.e., the event either contains the type as an attribute or it can be easily inferred from the event attributes using negligible system resources. Pattern size (i.e., the number of distinct primitive events in a pattern) is denoted by n.

The predicates to be satisfied by the participating events are usually organized in a Boolean formula. Any condition can be specified on any attribute of an event, including the timestamp (e.g., for supporting multiple time windows).

The operators describe the relations between the events comprising a pattern match. Among the most commonly used operators are sequence (SEQ), conjunction (AND), disjunction (OR), negation (typically marked by ", requires the absence of an event from the stream) and Kleene closure (marked by '*', accepts multiple appearances of an event in a specified position). A pattern may include an arbitrary number of operators.

To illustrate the above, consider Example 1 again. Three event types will be defined according to the identifiers of the cameras generating them: A, B and C. For each primitive event, the attribute person_id will be set to contain a unique number identifying a recognized face. Then, to detect a sequence of occurrences of the same person in three areas in a 10-minute time period, the following pattern specification syntax, taken from SASE [Reference 48], will be used:

PATTERN SEQ (A a, B b, C c)
WHERE ((a.person_id=b.person_id) A
(b.person_id=c.person_id))
WITHIN 10 minutes.

On system initialization, the pattern declaration is passed to the plan generation algorithm $\mathcal{A}$ to create the evaluation plan. The evaluation plan provides a scheme for the CEP engine, according to which its internal pattern representation is created. The plan generation algorithm accepts a pattern specification P and a set of statistical data characteristic values Stat. It then returns the evaluation plan to be used for detection. If these values are not known in advance, a default, empty Stat, is passed. Multiple plan generation algorithms have been devised, efficiently supporting patterns with arbitrarily complex combinations of the aforementioned operators [References 34, 32, 41].

In Example 1, Stat contains the arrival rates of event types A, B and C, the evaluation plan is an ordering on the above types, and $\mathcal{A}$ is a simple sorting algorithm, returning a plan following the ascending order of the arrival rates. The CEP engine then adheres to this order during pattern detection. Another popular choice for a statistic to be monitored is the set of selectivities (i.e., the probabilities of success) of the inter-event conditions defined by the pattern. Examples of plan generation algorithms requiring the knowledge of condition selectivities are presented below.

The plan generation algorithm attempts to utilize the information in Stat to find the best possible evaluation plan subject to some predefined set of performance metrics, which is denoted as Perf. These metrics may include throughput, detection latency, network communication cost, power consumption, and more. For instance, one possible value for Perf in Example 1 is {throughput, memory}, as processing the events according to the ascending order of their arrival rates was shown to vastly improve memory consumption and throughput of a CEP system [Reference 35].

In the general case, $\mathcal{A}$ is considered to be a computationally expensive operation. It is also assumed that this algorithm is optimal; that is, it always produces the best possible solution for the given parameters. While this assumption rarely holds in practice, the employed techniques usually tend to produce empirically good solutions.

Figure 3B:
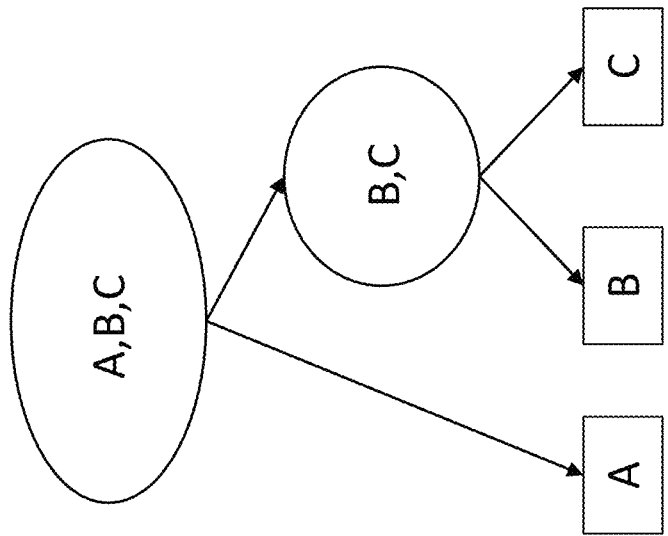
FIGS. 3A-3B demonstrate two possible tree-structured plans as defined by ZStream.
Figure 3A:
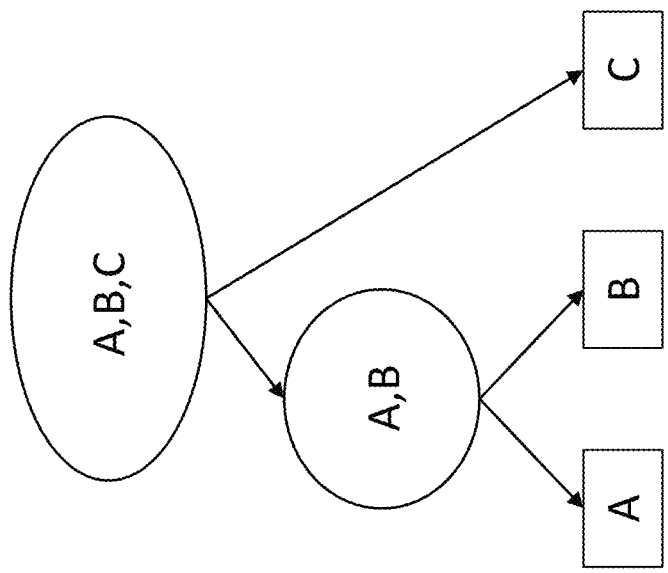

An evaluation plan is not constrained to be merely an order. FIG. 3A (left-deep plan) and 3B (right-deep plan) demonstrate two possible tree-structured plans as defined by ZStream [Reference 41]. An evaluation structure following such a plan accumulates the arriving events at their corresponding leaves, and the topology of the internal nodes defines the order in which they are matched and their mutual predicates are evaluated. Matches reaching the tree root are reported to the end users. From this point on, such plans will be denoted as tree-based plans, whereas plans similar to the one used for Example 1 will be called order-based plans. While the methods discussed in this paper are independent of the specific plan structure, order-based and tree-based plans will be used in the present examples.

Detection-Adaptation Loop

During evaluation, an ACEP system constantly attempts to spot a change in the statistical properties of the data and to react accordingly. This process, referred to as the detection-adaptation loop, is depicted in Algorithm 1 below:

---
Algorithm 1: Detection-adaptation loop in an ACEP system
---
Input: pattern specification P, plan generation algorithm
$\mathcal{A}$, reoptimizing decision function $\mathcal{D}$, initial statistic
values in_stat ∈ STAT
curr_plan ⇐ $\mathcal{A}$(P, in_stat)
while more events are available:
  process incoming events using curr_plan
  curr_stat (estimate current statistic values
  if $\mathcal{D}$ (curr_stat):
    new_plan ⇐ $\mathcal{A}$(P, curr_stat)
    if new_plan is better than curr_plan:
      curr_plan ⇐ new_plan
      apply curr_plan
---

The system accepts events from the input stream and processes them using the current evaluation plan. At the same time, the values of the data statistics in Stat are constantly re-estimated by the dedicated component (FIG. 2), often as a background task. While monitoring simple values such as the event arrival rates is trivial, more complex expressions (e.g., predicate selectivities) require advanced solutions. In the present disclosure, existing techniques from the field of data stream processing [References 12, 25] are used. These histogram-based methods allow to efficiently maintain a variety of stream statistics over sliding windows with high precision and require negligible system resources.

Opportunities for adaptation are recognized by the reoptimizing decision function $\mathcal{D}$, defined as follows:

$$\mathcal{D}: STAT \rightarrow \{true, false\}$$

where STAT is a set of all possible collections of the measured statistic values. $\mathcal{D}$ accepts the current estimates for the monitored statistic values and decides whether re-optimization is to be attempted. Whenever $\mathcal{D}$ returns true, $\mathcal{A}$ is invoked. The output of $\mathcal{A}$ is a new evaluation plan, which, if found more efficient than the current plan subject to the metrics in Perf, is subsequently deployed.

Methods for replacing an evaluation plan on-the-fly without significantly affecting system performance or losing intermediate results are a major focus of current research [Reference 27]. Numerous advanced techniques were proposed in the field of continuous query processing in data streams [References 8, 36, 51]. In the present disclosure, the CEP-based strategy introduced in [Reference 35] is used. Let $t_0$ be the time of creation of the new plan. Then, partial matches containing at least a single event accepted before $t_0$ are processed according to the old plan $p_{old}$, whereas the newly created partial matches consisting entirely of "new" events are treated according to the new plan $p_{new}$. Note that since $p_{old}$ and $p_{new}$ operate on disjoint sets of matches, there is no duplicate processing during execution. At time $t_0+W$ (where W is the time window of the pattern), the last "old" event expires and the system switches fully to $p_{new}$.

In general, the deployment procedure is considered to be a costly operation and will attempt to minimize the number of unnecessary plan replacements.

Reoptimizing Decision Problem

The reoptimizing decision problem is the problem of finding a function $\mathcal{D}$ that maximizes the performance of a CEP system subject to Perf. It can be formally defined as follows: given the pattern specification P, the plan generation algorithm $\mathcal{A}$, the set of monitored statistics Stat, and the set of performance metrics Perf, find a reoptimizing decision function $\mathcal{D}$ that achieves the best performance of the ACEP detection-adaptation loop (Algorithm 1) subject to Perf.

In practice, the quality of $\mathcal{D}$ is determined by two factors. The first factor is the correctness of the answers returned by $\mathcal{D}$. Wrong decisions can either fall into the category of false positives (returning true when the currently used plan is still the best possible) or false negatives (returning false when a more efficient plan is available). Both cases cause the system to use a sub-optimal evaluation plan. The second factor is the time and space complexity of $\mathcal{D}$. In this sense, an accurate yet resource-consuming implementation of $\mathcal{D}$ may severely degrade system performance regardless of its output.

The tree-based NFA [Reference 35] defines a trivial decision function $\mathcal{D}$, unconditionally returning true. In ZStream [Reference 41] this functions loops over all values in the input parameter curr_stat and returns true if and only if a deviation of at least t is detected.

Invariant-Based Method for the Reoptimizing Decision Problem

Figure 4:
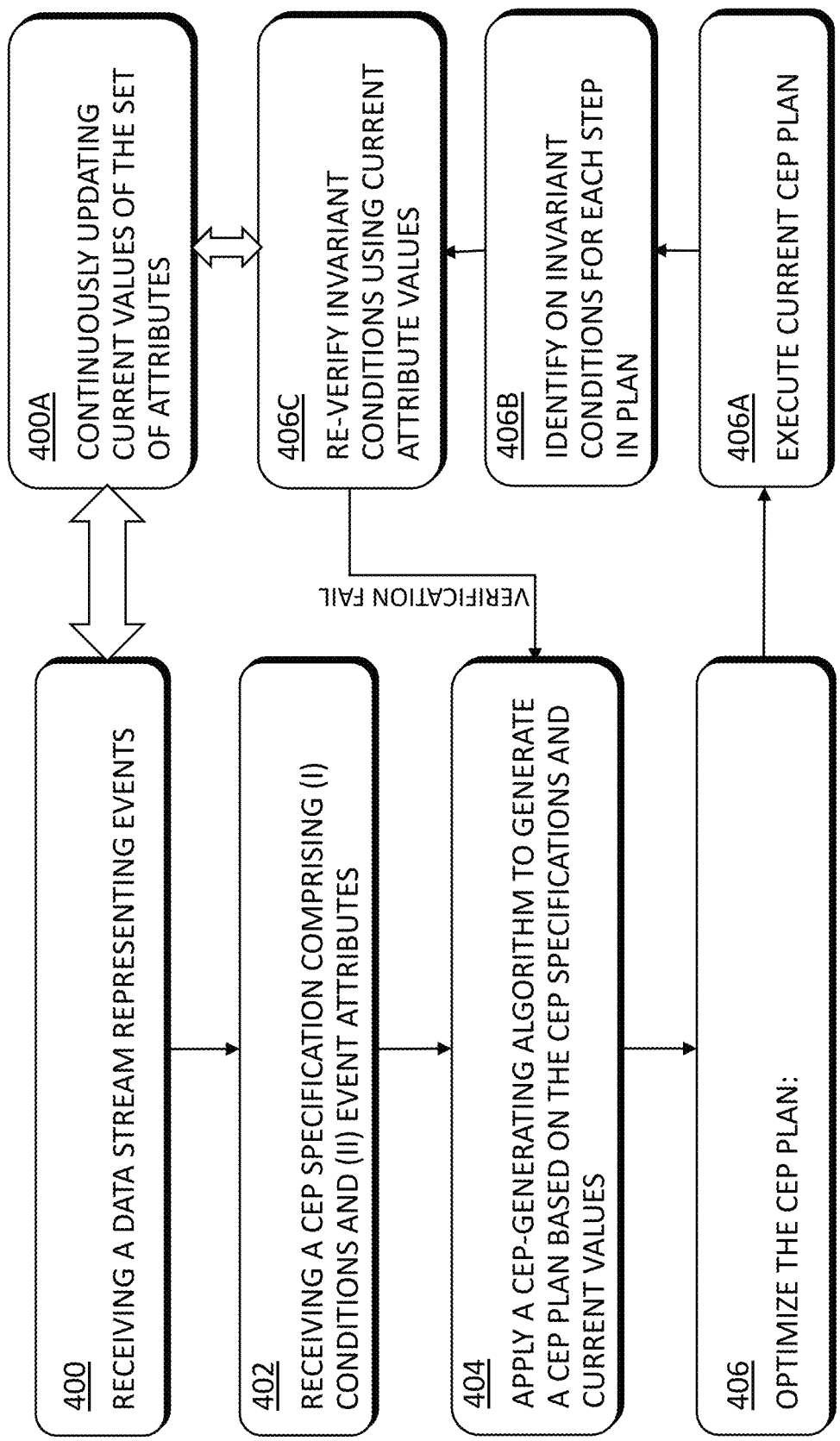
FIG. 4 is a flowchart of functional steps in a process in accordance with some embodiments of the present invention.

FIG. 4 is a flowchart of functional steps in a process in accordance with some embodiments of the present invention.

At step 400, the process receives, receiving, as input, a data stream representing events.

At step 400A, current attribute values are continuously updated from said data stream.

At step 402, the process receives a complex event pattern (CEP) specification representing an occurrence of a CEP in said data stream. The CEP specification comprises (a) a set of conditions associated with relations among the events, and (b) a set of attributes associated with the events.

At step 404, a CEP-generating algorithm is applied, to generate, based on the CEP specification and attribute current values, a current CEP plan configured to determine the occurrence of the CEP in the data stream. The current CEP plan comprises a series of execution steps.

At step 406, an iterative process is performed to optimize the current CEP plan by:
  (i) 406A: executing the current CEP plan,
  (ii) 406B: identifying, with respect to each execution step, one invariant conditions whose verification causes the execution step to be included in the current CEP plan, an
  (iii) 406C: performing a re-verification of all the identified invariant conditions using updated current attribute values; and
  (iv) 406D: re-applying the CEP-generating algorithm when the re-verification fails with respect to at least one invariant condition, to generate an updated CEP plan.

As illustrated above, the main drawback of the previously proposed decision functions is their coarse granularity, as the same condition is verified for every monitored data property. The present disclosure proposes a different approach, based on constructing a set of fine-grained invariants that reflect the existing connections between individual data characteristics. The reoptimizing decision function $\mathcal{D}$ will then be defined as a conjunction of these invariants.

Invariant Creation

A decision invariant (or simply invariant) will be defined as an inequality of the following form:

$$f_1(stat_1) < f_2(stat_2),$$

where $stat_1, stat_2 \in STAT$ are sets of the monitored statistic values and $f_1, f_2: STAT \rightarrow \mathbb{R}$ are arbitrary functions.

The present disclosure is interested in finding a single invariant for each building block of the evaluation plan in current use. A building block is defined as the most primitive, indivisible part of a plan. An evaluation plan can then be seen as a collection of building blocks. For instance, the plan for detecting a sequence of three events of types A, B and C, discussed in Example 1, is formed by the following blocks:
  (i) "Accept an event of type C";
  (ii) "Scan the history for events of type B matching the accepted C";
  (iii) "Scan the history for events of type A matching the accepted C and B".

In general, in an order-based plan, each step in the selected order will be considered a block, whereas for tree-based plans a block is equivalent to an internal node.

It is known that the specific plan from the above example was chosen because the plan generation algorithm $\mathcal{A}$ sorts the event types according to their arrival rates. If, for instance, the rate of B exceeded that of A, the second block would have been "Scan the history for events of type A matching the accepted C" and the third would also have changed accordingly. In other words, the second block of the plan is so defined because, during the run of $\mathcal{A}$, the condition $rate_B < rate_A$ was at some point checked, and the result of this check was positive. Following the terminology defined above, in this example STAT consists of all valid arrival rate values and $f_1, f_2$ are trivial functions, i.e., $f_1(x) = f_2(x) = x$.

Any condition (over the measured statistic values) whose verification has led the algorithm to include some building block in the final plan will be denoted as a deciding condition. Obviously, no generic method exists to distinguish between a deciding condition and a regular one. This process is to be applied separately on any particular algorithm $\mathcal{A}$ based on its semantics. In the present example, assume that the arrival rates are sorted using a simple min-sort algorithm, selecting the smallest remaining one at each iteration. Then, any comparison between two arrival rates will be considered a deciding condition, as opposed to any other condition which may or may not be a part of the implementation of this particular algorithm.

When $\mathcal{A}$ is invoked on a given input, locations can be marked in the algorithm's execution flow where the deciding conditions are verified. Any actual verification of a deciding condition is called a block-building comparison (BBC). For instance, assume that execution of the present min-sort algorithm begins, and a deciding condition $rate_C < rate_A$ is verified. Further assume that $rate_C$ is smaller than $rate_A$. Then, this verification is a BBC associated with the building block "Accept an event of type C first", because, unless this deciding condition holds, the block will not be included in the final plan. This will also be the case if $rate_C < rate_B$ is subsequently verified and $rate_C$ is smaller. If $rate_B$ is smaller, the opposite condition, $rate_B < rate_C$, becomes a BBC associated with a block "Accept an event of type B first". Overall, (n−1) BBCs take place during the first min-sort iteration, (n−2) during the second iteration, and so forth.

In general, for each building block b of any evaluation plan, there can be determined a deciding condition set (DCS). A DCS of b consists of all deciding conditions that were actually checked and satisfied by BBCs belonging to b as explained above. Note that, by definition, the intersection of two DCSs is always empty. In the present example, assuming that the blocks listed above are denoted as $b_1$, $b_2$, $b_3$, the deciding condition sets are as follows:

$$DCS_1 = \{rate_C < rate_B, rate_C < rate_A\},$$

$$DCS_2 = \{rate_B < rate_A\},$$

$$DCS_3 = \emptyset.$$

As long as the above conditions hold, no other evaluation plan can be returned by $\mathcal{A}$. On the other hand, if any of the conditions is violated, the outcome of $\mathcal{A}$ will result in generating a different plan. If the decision function $\mathcal{D}$ is defined as a conjunction of the deciding condition sets, situations will be recognized in which the current plan becomes sub-optimal with high precision and confidence.

However, verifying all deciding conditions for all building blocks is very inefficient. In the present simple example, the total number of such conditions is quadratic in the number of event types participating in the pattern. For more complicated plans and generation algorithms, this dependency may grow to a high-degree polynomial or even become exponential. Since the adaptation decision is made during every iteration of Algorithm 1 above, the overhead may negatively affect the system throughput and the response time.

To overcome this problem, the number of conditions will be constrained to be verified by $\mathcal{D}$ to one per building block. For each deciding condition set $DCS_i$, there will be determined the tightest condition, that is, the one that was closest to being violated during plan generation. This tightest condition will be selected as an invariant of the building block $b_i$. In other words, there may be alternatively defined an invariant as a deciding condition selected for actual verification by $\mathcal{D}$ out of a DCS. More formally, given a set $$DCS_i = \{c_1, \ldots, c_m\}$$

such that $$c_k = (f_{k,1}(stat_{k,1}) < f_{k,2}(stat_{k,2})),$$

a condition that minimizes the expression $$(f_{k,2}(stat_{k,2}) - f_{k,1}(stat_{k,1}))$$

as an invariant of the building block $b_i$.

In the example above, the invariant for $DCS_i$ is $rate_C < rate_B$, since it is known that $rate_B < rate_A$, and therefore $rate_B - rate_C < rate_A - rate_C$. It is clear that $rate_B$ is a tighter bound for the value of $rate_C$ than $rate_A$.

To summarize, the process of invariant creation proceeds as follows. During the run of $\mathcal{A}$ on the current set of statistics Stat, its execution is closely monitored. Whenever a block-building comparison is detected for some block b, the corresponding deciding condition to the DCS of b is added. After the completion of $\mathcal{A}$, the tightest condition of each DCS is extracted and added to the invariant list.

Figure 5B:
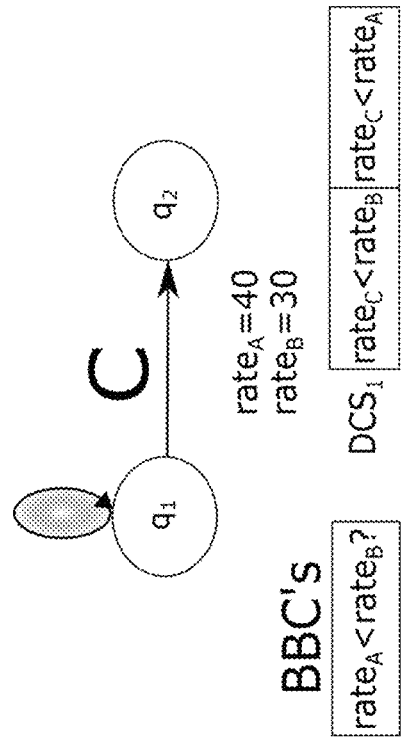
FIGS. 5A-5D demonstrate the invariant creation process, in accordance with some embodiments of the present invention.
Figure 5A:
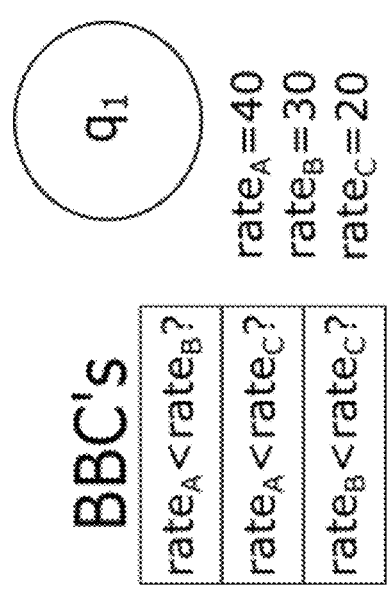
Figure 5D:
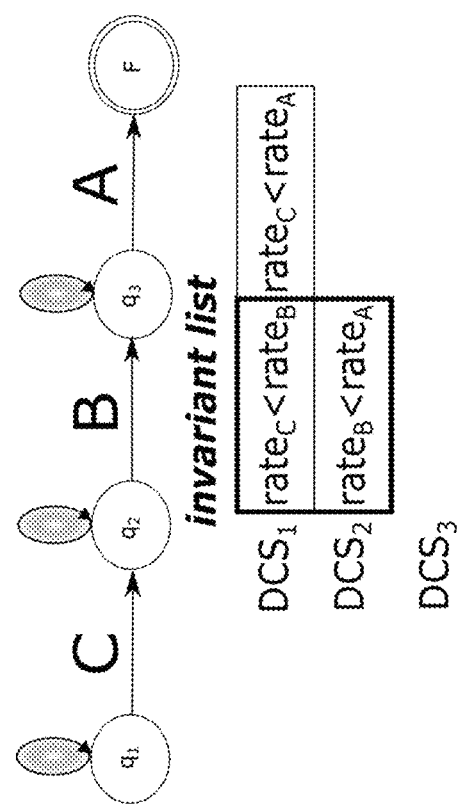
Figure 5C:
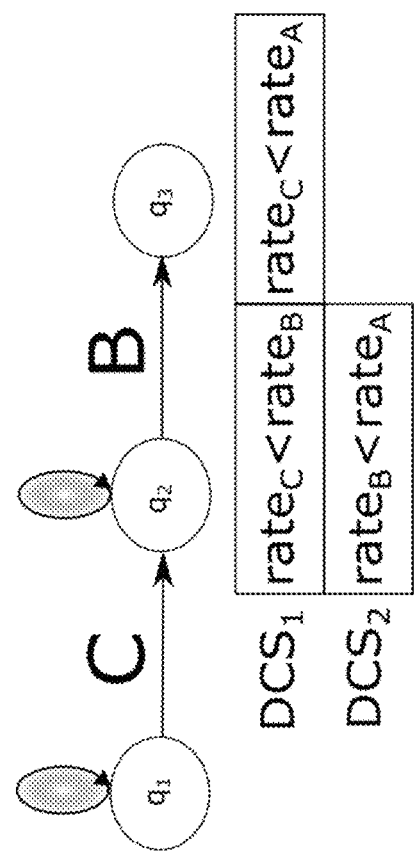

FIGS. 5A-5D demonstrate the invariant creation process applied on the pattern from Example 1 and the rate-sorting algorithm $\mathcal{A}$ discussed above. Each of FIGS. 5A-5B depicts a different stage in the plan generation and presents the DCSs and the BBCs involved at this stage. Accordingly, FIG. 5A shows selecting the first event type in the detection order; in FIG. 5B, C is set as the first event type, and selection of the second event type is in process; in FIG. 5C, B is set as the second type, and only a single event type remains for the third position; and in FIG. 5D, the evaluation plan and the invariant set are finalized.

As discussed above, this generic method has to be adapted to any specific implementation of $\mathcal{A}$. This is trivially done for any $\mathcal{A}$ which constructs the solution plan in a step-by-step manner, selecting and appending one building block at a time. However, for algorithms incorporating other approaches, such as dynamic programming, it is more challenging to attribute a block-building comparison to a single block of the plan.

Invariant Verification and Adaptation

During the execution of the detection-adaptation loop (Algorithm 1 above), $\mathcal{D}$ traverses the list of invariants built as described above. It returns true if a violated invariant was found (according to the current statistic estimates) and false otherwise. This list is sorted according to the order of the respective building blocks in the evaluation plan. In Example 1, first the invariant $rate_C < rate_B$ will be verified, followed by $rate_B < rate_A$. The reason is that an invariant implicitly assumes the correctness of the preceding invariants (e.g., $rate_B < rate_A$ assumes that $rate_C < rate_B$ holds; otherwise, it should have been changed to $rate_C < rate_A$). For tree-based plans, the verification proceeds in a bottom-up order. For example, for the tree plan displayed in FIG. 3A, the order is (A, B)→(A, B, C).

If a violation of an invariant is detected, $\mathcal{A}$ is invoked to create a new evaluation plan. In this case, the currently used invariants are invalidated and a new list is created following the process described above. Subsequent verifications performed by $\mathcal{D}$ are then based on the new invariants.

Assuming that any invariant can be verified in constant time and memory, the complexity of $\mathcal{D}$ using the invariant-based method is O(B), where B is the number of the building blocks in an evaluation plan. This number is bounded by the pattern size (the number of event types participating in a pattern) for both order-based and tree-based plans. To guarantee this result, an application of the invariant-based method on a specific implementation of $\mathcal{A}$ has to ensure that the verification of a single invariant is a constant-time operation.

Correctness Guarantees and the K-Invariant Method

It will now be formally proven that the invariant-based method presented above guarantees that no false positive detections will occur during the detection-adaptation loop.

Theorem 1: Let $\mathcal{D}$ be a reoptimizing decision function implemented according to the invariant-based method. Let $\mathcal{A}$ be a deterministic plan generation algorithm in use and let p be the currently employed plan. Then, if at some point during execution $\mathcal{D}$ returns true, the subsequent invocation of $\mathcal{A}$ will return a plan p', such that p'≠p.

By definition, if $\mathcal{D}$ returns true, then there is at least one invariant whose verification failed, i.e., its deciding condition does not hold anymore. Let c be the first such condition, and let $b_i$ be the building block such that c∈$DCS_i$ (recall that there is only one such $b_i$). Then, by determinism of $\mathcal{A}$ and by the ordering defined on the invariants, the new run of $\mathcal{A}$ will be identical to the one that produced p until the block-building comparison that checks c. At that point, by definition of the block-building comparison, the negative result of validating c will cause $\mathcal{A}$ to reject $b_i$ as the current building block and select a different one, thus producing a plan p', which is different from p.

Since it is assumed that $\mathcal{A}$ always produces the optimal solution, the above result can be extended.

Corollary 1: Let $\mathcal{D}$ be an invariant-based reoptimizing decision function and let $\mathcal{A}$ be a deterministic plan generation algorithm in use. Then, if at some point during execution $\mathcal{D}$ returns true, the subsequent invocation of $\mathcal{A}$ will return a plan that is more efficient than the currently employed one.

Note that the opposite direction of Theorem 1 does not hold. It is still possible that a more efficient evaluation plan can be deployed, yet this opportunity will not be detected by $\mathcal{D}$ because there is only picked a single condition from each deciding condition set. If the whole union of the above sets were to be included in the invariant set, even stronger guarantees could be achieved, as stated in the following theorem.

Theorem 2: Let $\mathcal{D}$ be a reoptimizing decision function implemented according to the invariant-based method, with all conditions from all DCSs included in the invariant set. Let $\mathcal{A}$ be a deterministic plan generation algorithm in use and let p be the currently employed plan. Then, if and only if at some point during the execution $\mathcal{D}$ returns true, the subsequent invocation of $\mathcal{A}$ will return a plan p', such that p'≠p.

The first direction follows immediately from Theorem 1. For the second direction, let p'≠p and let $b_i \in p$, $b_i' \in p'$ be the first building blocks that differ in p and p'. By $\mathcal{A}$'s determinism, there exist $f_1$, $f_2$, $stat_1$, $stat_2$s. t.

$$(f_1(stat_1) \leq f_2(stat_2)) \in DCS_i$$

$$(f_2(stat_2) \leq f_i(stat_i)) \in DCS_i,$$

as otherwise there would be no way for $\mathcal{A}$ to deterministically choose between $b_i$ and $b_j$. Since p' was created by $\mathcal{A}$ using the currently estimated statistic values, it can be deduced that $f_2(stat_2) < f_1(stat_1)$ holds. Consequently, $f_1(stat_1) < f_2(stat_2)$ does not hold. By the assumption that all deciding conditions are included in the invariant set, $\mathcal{D}$ will necessarily detect this violation, which completes the proof.

The above result shows that greater precision can be gained if the number of monitored invariants per building block is not limited. However, as discussed above, validating all deciding conditions may drastically increase the adaptation overhead.

The tradeoff between performance and precision can be controlled by introducing a new parameter K, defined as the maximal number of conditions from a deciding set to select as invariants. The method using a specific value of K is referred to as the K-invariant method, as opposed to the basic invariant method discussed above. Note that the 1-invariant method is equivalent to the basic one. The K-invariant method becomes more accurate and more time-consuming for higher values of K. The total number of the invariants in this case is at most K·(B−1).

Distance-Based Invariants

By Corollary 1 above, it is guaranteed that a new, better evaluation plan will be produced following an invariant violation. However, the magnitude of its improvement over the old plan is not known. Consider a scenario in which two event types in a pattern have very close arrival rates. Further assume that there are slight oscillations in the rates, causing the event types to swap positions periodically when ordered according to this statistic. If an invariant is defined comparing the arrival rates of these two types, then $\mathcal{D}$ will discover these minor changes and two evaluation plans with little to no difference in performance will be repeatedly produced and deployed. Although not a "false positive" by definition, the overhead implied by this situation may exceed any benefit of using an adaptive platform.

To overcome this problem, the notion of the minimal distance d will be introduced, defined as the smallest relative difference between the two sides of the inequality required for an invariant to be considered as violated. That is, given a deciding condition $f_{k,1}(stat_{k,1}) \leq f_{k,2}(stat_{k,2})$, the invariant will be constructed to be verified by $\mathcal{D}$ as follows:

$$(1+d) \cdot f_{k,1}(stat_{k,1}) \leq f_{k,2}(stat_{k,2}).$$

The experimental study detailed elsewhere herein demonstrates that a correctly chosen d leads to a significant performance improvement over the basic technique. However, finding a sufficiently good d is a difficult task, as it depends on the data, the type of statistics, the invariant expression, and the frequency and magnitude of the runtime changes. Accordingly, the following directions are identified for solving this problem:

(i) Parameter scanning: empirically checking a range of candidate values to find the one resulting in the best performance. This method is the simplest, but often infeasible in real-life scenarios.

(ii) Data analysis methods: deriving d from the currently available statistics can provide a good estimate in some cases. For instance, it can be calculated as the average relative difference between the sides of a deciding condition obtained during the initial plan generation, or, more formally:

$$d = AVG\left( \frac{|(f_{k,2}(stat_{k,2}) - f_{k,1}(stat_{k,1}))|}{\min(f_{k,1}(stat_{k,1}), f_{k,2}(stat_{k,2}))} \right).$$

The effectiveness of this approach depends on the distribution and the runtime behavior of the statistical values. Specifically, false positives may be produced when the values are very close and the changes are frequent. Still, it is expected to perform reasonably well in the common case. This technique can also be utilized to produce a starting point for parameter scanning.

(iii) Meta-adaptive methods: dynamically tuning d on-the-fly to adapt it to the current stream statistics. This might be the most accurate and reliable solution. At the start, an initial value is selected, possibly obtained using the above techniques. Then, as invariants are violated and new plans are computed, d is modified to prevent repeated re-optimization attempts when the observed gain in plan quality is low. An even higher precision can be achieved by additionally utilizing fine-grained per-invariant distances.

Applications of the Invariant-Based Method

There is presented a generic method for defining a reoptimizing decision function $\mathcal{D}$ as a list of invariants. As was shown, additional steps are required in order to apply this method to a specific choice of the evaluation plan structure and the plan generation algorithm. Namely, the following should be strictly defined: (i) what is considered a building block in a plan; (ii) what is considered a block-building comparison in $\mathcal{A}$; and (iii) how to associate a BBC with a building block. Additionally, efficient verification of the invariants must be ensured. In this section, this process will be exemplified on two plan-algorithm combinations taken from previous works in the field. The experimental results shown elsewhere herein will also be conducted on these adapted algorithms.

Greedy Algorithm for Order-Based Plans

The greedy heuristic algorithm based on cardinalities and predicate selectivities was first described in [Reference 46] for creating left-deep tree plans for join queries. It was adapted to the CEP domain in [Reference 34]. The algorithm supports all operators described above and their arbitrary composition. Its basic form, it only targets conjunction and sequence patterns of arbitrary complexity. Support for other operators and their composition is implemented by either activating transformation rules on the input pattern or applying post-processing steps on the generated plan (e.g., to augment it with negated events).

The algorithm proceeds iteratively, selecting at each step the event type which is expected to minimize the overall number of partial matches (subsets of valid pattern matches) to be kept in memory. At the beginning, the event type with the lowest arrival rate (multiplied by the selectivities of any predicates possibly defined solely on this event type) is chosen. At each subsequent step i; i>1, the event type to be selected is the one that minimizes the expression $(\Pi_{j=1}^{i} r_{p_j} \cdot \Pi_{j,k \leq i} sel_{p_j,p_k})$, where $r_x$ stands for the arrival rate of the $x^{th}$ event type in a pattern, $sel_{x,y}$ is the selectivity of the predicate defined between the $x^{th}$ and the $y^{th}$ event types (equals to 1 if no predicate is defined), $p_1, \ldots, p_{i-1}$ are the event types selected during previous steps, and $p_i$ is the candidate event type for the current step. Since a large part of this expression is constant when selecting $p_i$, it is sufficient to find an event type, out of those still not included in the plan, minimizing $(r_{p_i} \cdot sel_{p_i,p_i} \cdot \Pi_{k<i} sel_{p_k,p_i})$.

Algorithm 2 depicts the plan generation process. When all selectivities satisfy $sel_{x,y} = 1$, i.e., no predicates are defined for the pattern, this algorithm simply sorts the events in an ascending order of their arrival rates:

---
Algorithm 2: Greedy Algorithm for Order-Based Plans
---

Input: event types $e_1, \ldots, e_n$, arrival rates $r_1, \ldots, r_n$,
inter-event predicate selectivities
$sel_{1,1}, \ldots, sel_{n,n}$
Output: order-based evaluation plan $E = e_{p_1}, e_{p_2}, \ldots, e_{p_n}$
    $E \Leftarrow \emptyset$; $p_1 = argmin_j\{r_j \cdot sel_{j,j}\}$
    add $e_{p_1}$ to E
    for i from 2 to n:
        $p_i = argmin_{j \notin E}\{r_j \cdot sel_{j,j} \cdot \Pi_{k<i} sel_{p_k,j}\}$
        add $e_{p_i}$ to E
    return E

---

A building block for order-based evaluation plans produced by Algorithm 2 may be defined as a single directive of processing an event type in a specific position of a plan. That is, a building block is an expression of the form "Process the event type $e_j$ at $i^{th}$ position in a plan". Obviously, a full plan output by the algorithm contains exactly n blocks, and a total of $O(n^2)$ blocks is considered during the run. Deciding conditions created for such a block are defined as:

$$r_j \cdot sel_{j,j} \prod_{k<i} sel_{p_k,j} < r_{j'} \cdot sel_{j',j'} \cdot \prod_{k<i} sel_{p_k,j'}.$$

Here, $e_{j'}, j' \neq j$ is an event type which was considered to occupy $i^{th}$ position at some point but eventually $e_j$ was selected. Note that, while in the worst case the products may contain up to n−1 multiplicands, in most cases the number of the predicates defined over the events in a pattern is significantly lower than $n^2$. Therefore, invariant verification will be executed in near-constant time.

Dynamic Programming Algorithm for Tree-Based Plans

The authors of ZStream [41] introduced an efficient algorithm for producing tree-based plans based on dynamic programming (Algorithm 3):

---
Algorithm 3: ZStream algorithm for tree-based plans
---

Input: event types $e_1, \ldots, e_n$, arrival rates $r_1, \ldots, r_n$,
inter-event predicate selectivities
$sel_{1,1}, \ldots, sel_{n,n}$
Output: tree-based evaluation plan T
    subtrees $\Leftarrow$ new two-dimensional matrix of size n × n
    for i from 1 to n:
        subtrees[i][1].cardinality = subtrees[i][1].cost = $r_i$
    for i from 2 to n:
        for j from 1 to n − i + 1:
            for k from j + 1 to j + i:
                new_cardinality = Card(
                    subtrees[k − j][j].cardinality,
                    subtrees[i − (k − j)][k].cardinality)
                new_cost = subtrees[k − j][j].cost +
                    + subtrees[i − (k − j)][k].cost + new_cardinality
                if new_cost < subtrees[i][j].cost:
                    subtrees[i][j].tree = new_tree(
                        subtrees[k − j][j],subtrees[i − (k − j)][k])
                    subtrees[i][j].cardinality = new_cardinality
                    subtrees[i][j].cost = new_cost
    return subtrees[n][1].tree

---

The algorithm consists of n−1 steps, where during the $i^{th}$ step the tree-based plans for all subsets of the pattern of size i+1 are calculated (for the trees of size 1, the only possible tree containing the lone leaf is assumed). During this calculation, previously memorized results for the two subtrees of each tree are used. To calculate the cost of a tree T with the subtrees L and R, the following formula is used:

$$Cost(T) = \begin{cases} r_i & T \text{ is a leaf} \\ Cost(L) + Cost(R) + Card(L, R) & \text{otherwise,} \end{cases}$$

where Card(L, R) is the cardinality (the expected number of partial matches reaching the root) of T, whose calculation depends on the operator applied by the root. For example, the cardinality of a conjunction node is defined as the product of the cardinalities of its operands multiplied by the total selectivity of the conditions between the events in L and the events in R. That is, $$Card(T) = Card(L) \times Card(R) \times SEL(L,R),$$

where SEL(L, R) is a product of all predicate selectivities $sel_{i,j}: i \in L, j \in R$. Leaf cardinalities are defined as the arrival rates of the respective event types.

To apply the invariant-based method, each internal node of a tree-based plan will be defined as a building block. This way, up to $O(n^3)$ blocks will be formed during the run of Algorithm 3, with only $O(n)$ included in the resulting plan.

A comparison between the costs of two trees will be considered a block-building comparison for the root of the less expensive tree. The deciding conditions for this algorithm will be thus defined simply as $Cost(T_1) < Cost(T_2)$, where $T_1$, $T_2$ are the two compared trees. These comparisons are invoked at each step during the search for the cheapest tree over a given subset of events. For k events, the number of candidate trees is $$C_{k-1} = \frac{(2k-2)!}{(k-1)!k!},$$

where $C_m$ is the $m^{th}$ Catalan number. Therefore, picking only one comparison as an invariant and dismissing the rest of the candidates may create a problem of false negatives, and K-invariant method is recommended instead.

The obvious problem with the above definition is that tree cost calculation is a recursive function, which contradicts the constant-time invariant verification assumption. This recursion will be eliminated by utilizing the following observation. In Algorithm 3, all block-building comparisons are performed on pairs of trees defined over the same set of event types. By invariant definition, one of these trees is always a subtree of a plan currently being in use. Recall that invariants on tree-based plans are always verified in the direction from leaves to the root. Hence, if any change was detected in one of the statistics affecting the subtrees of the two compared trees, it would be noticed during verification of earlier invariants. Thus, it is safe to represent the cost of a subtree in an invariant as a constant whose value is initialized to the cost of that subtree during invariant creation (i.e., plan construction).

General Applicability of the Invariant-Based Method

The approaches described above only cover two special cases. Here, the present disclosure is egenralied to apply the invariant-based method to any greedy or dynamic programming algorithm. The applicability of the present method to other algorithm categories is also considered.

A generalized variation of the technique illustrated above can be utilized for any greedy plan generation algorithm. To that end, a part of a plan constructed during a single greedy iteration should be defined as a building block. Additionally, a conjunction of all conditions evaluated to select a specific block is to be defined as a block-building comparison associated with this block. Since most greedy algorithms require constant time and space for a single step, the complexity requirements for the invariant verification will be satisfied.

Using similar observations, it can be generalized that the approach described above to any dynamic programming algorithm. A subplan memorized by the algorithm will correspond to a building block. A comparison between two subplans will serve as a BBC for the block that was selected during the initial run.

In general, the invariant-based method can be similarly adapted to any algorithm that constructs a plan in a deterministic, bottom-up manner, or otherwise includes a notion of a "building block".

In contrast, algorithms based on local search (adapted to CEP in [34]) cannot be used in conjunction with the invariant-based method. Rather than building a plan step-by-step, these algorithms start with a complete initial solution and modify it to create an improved version [3].

Experimental Evaluation

In this section, the results of experimental evaluations are presented. The objectives of this empirical study were twofold. First, the objective is to assess the overall system performance achieved by the present approach and the computational overhead implied by its adaptation process as compared to the existing strategies for ACEP systems. The objective is to explore how changes in the parameters of the present method and of the data characteristics impact the above metrics.

Experimental Setup

The two CEP models described above were implemented: the lazy NFA [35] with the greedy order-based algorithm [46] and the ZStream model with tree-based dynamic programming algorithm [41]. Also added was support for three adaptation methods (i.e., implementations of $\mathcal{D}$): (i) the unconditional reoptimization method from [35]; (ii) the constant-threshold method from [41]; and (iii) the invariant-based method. To accurately estimate the event arrival rates and predicate selectivities on-the-fly, the algorithm from [25] was utilized for maintaining statistics over sliding window.

Since the plan generation algorithms used during this study create plans optimized for maximal throughput, throughput was chosen as a main performance metric, reflecting the effectiveness of the above algorithms in the presence of changes in the input. Similar results could be obtained for algorithms targeting any other optimization goal, such as minimizing latency or communication cost.

Two real-world datasets were used in the experiments. For each of them, 5 sets of patterns containing different operators were created, as follows:
(i) sequences;
(ii) sequences with an additional event under negation;
(iii) conjunctions;
(iv) sequences with a single event under Kleene closure; and
(v) composite patterns, consisting of a disjunction of three sequences.

Each set contained 6 patterns of sizes varying from 3 to 8. Pattern size was defined as the number of events in a pattern for sets 1-4 and the number of events in each subpattern for set 5.

The first dataset contains vehicle traffic sensor data, provided by City of Aarhus, Denmark [7] and collected over a period of 4 months from 449 observation points, with 13,577,132 primitive events overall. Each event represents an observation of traffic at the given point. The attributes of an event include, among others, the point ID, the average observed speed, and the total number of observed vehicles during the last 5 minutes. The arrival rates and selectivities for this dataset were highly skewed and stable, with few on-the-fly changes. However, the changes that did occur were mostly very extreme. The patterns for this dataset were motivated by normal driving behavior, where the average speed tends to decrease with the increase in the number of vehicles on the road. The objective was to detect violations of this model, i.e., combinations (sequences, conjunctions, etc., depending on the operator involved) of three or more observations with either an increase or a decline in both the number of vehicles and the average speed.

The second dataset was taken from the NASDAQ stock market historical records [52]. Each record in this dataset represents a single update to the price of a stock, spanning a 1-year period and covering over 2,100 stock identifiers with prices updated on a per minute basis. The input stream contained 80,509,033 primitive events, each consisting of a stock identifier, a timestamp, and a current price. For each stock identifier, a separate event type was defined. In addition, the data was preprocessed to include the difference between the current and the previous price. Contrary to the traffic dataset, low skew in data statistics was observed, with the initial values nearly identical for all event types. The changes were highly frequent, but mostly minor. The patterns to evaluate were then defined as combinations of different stock identifiers (types), with the predefined price differences (e.g., for a conjunction pattern AND (A, B, C) A.diff<B.diff<C.diff was required).

All models and algorithms under examination were implemented in Java. All experiments were run on a computer with 2.20 Ghz CPU and 16.0 GB RAM.

Experimental Results

In the first experiment, the performance of the invariant-based method for different values of the invariant distance d, obtained by parameter scanning, was evaluated. In this experiment, only the sequence pattern sets were used. For each of the four possible dataset-algorithm combinations, the system throughput was measured as a function of the tested pattern size and of d, with its values ranging from 0 (which corresponds to the basic method) to 0.5.

Figure 6A:
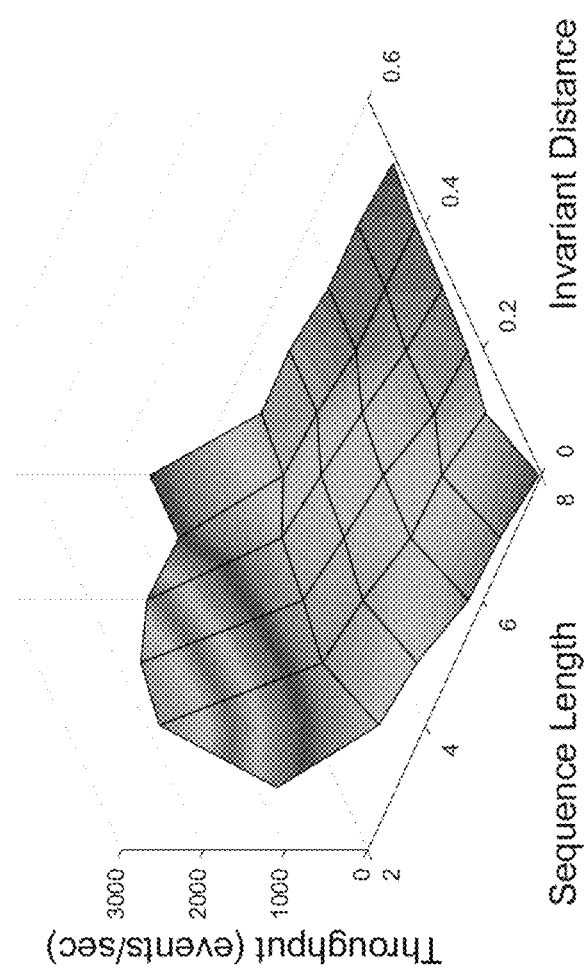
FIGS. 6A-6D, 7A-7H, and 8A-8H show experimental results, in accordance with some embodiments of the present invention.
Figure 6B:
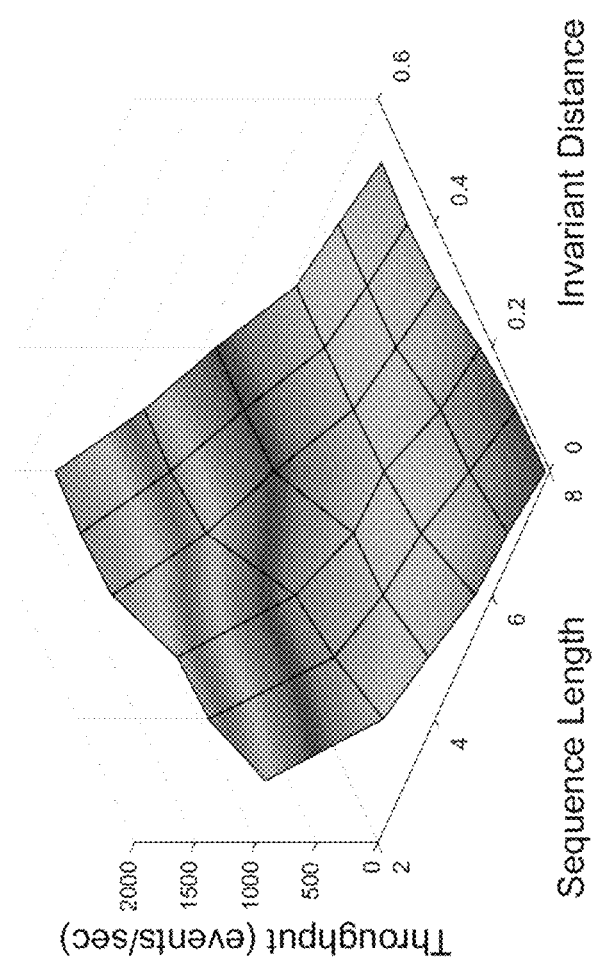
Figure 6C:
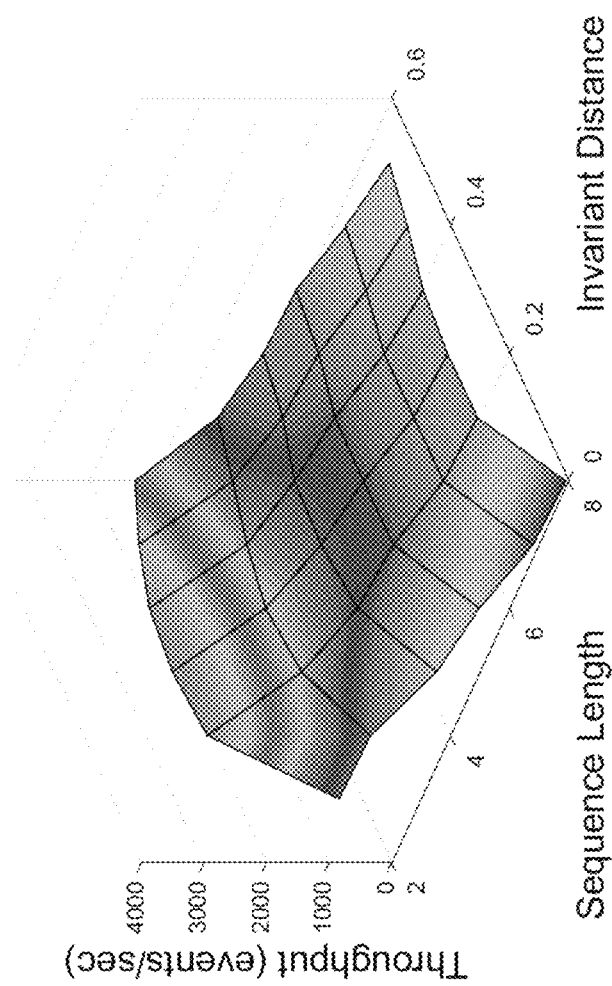
Figure 6D:
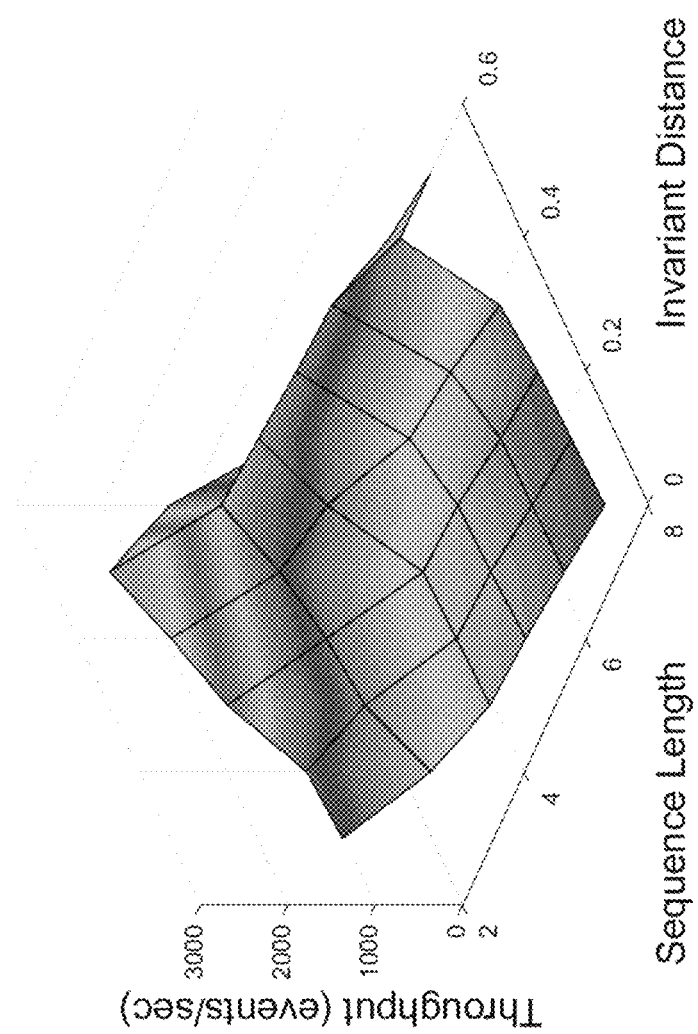
Figure 7B:
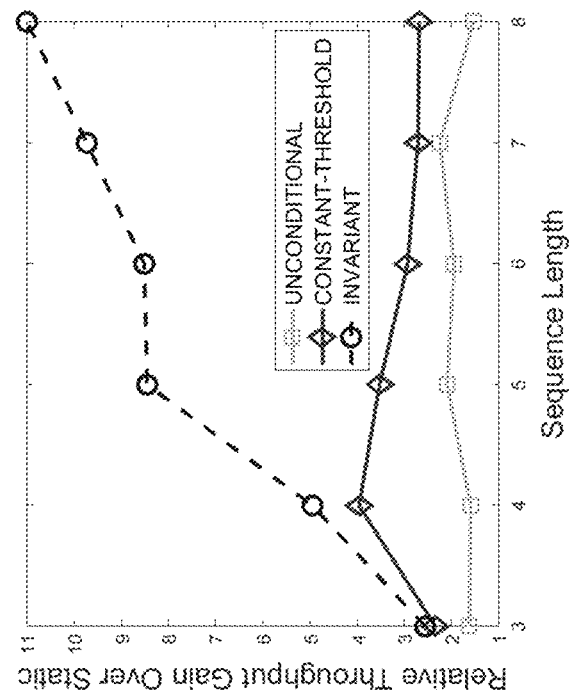
Figure 7A:
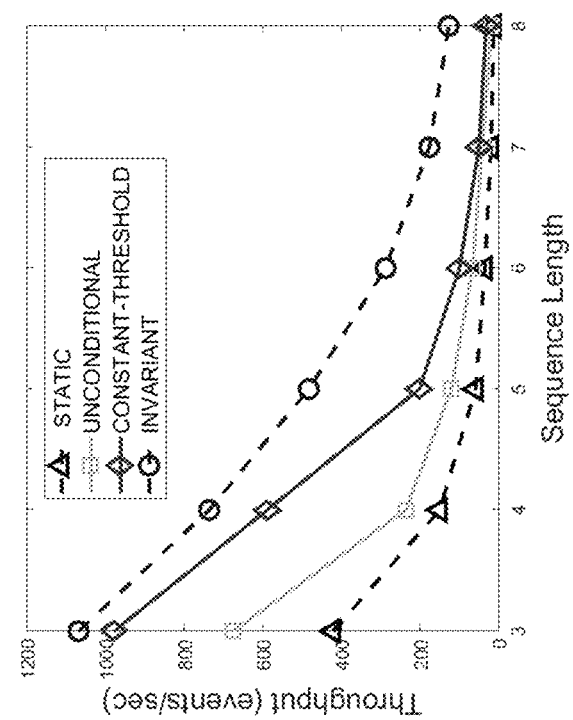
Figure 7C:
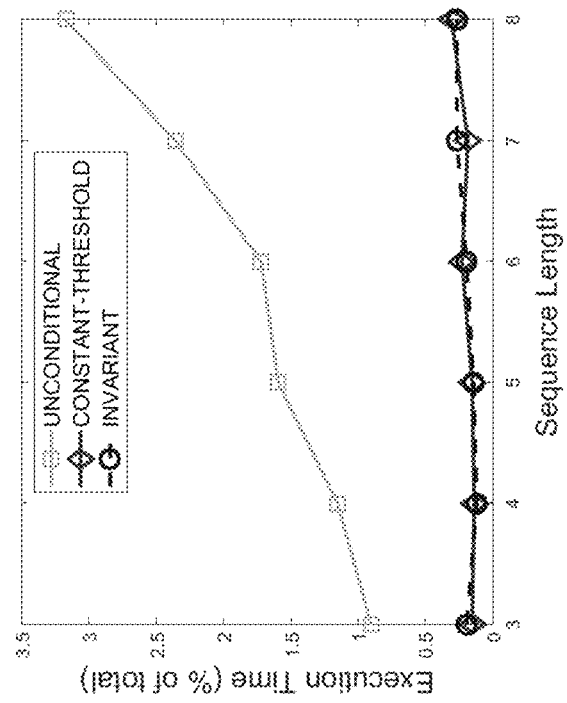
Figure 7D:
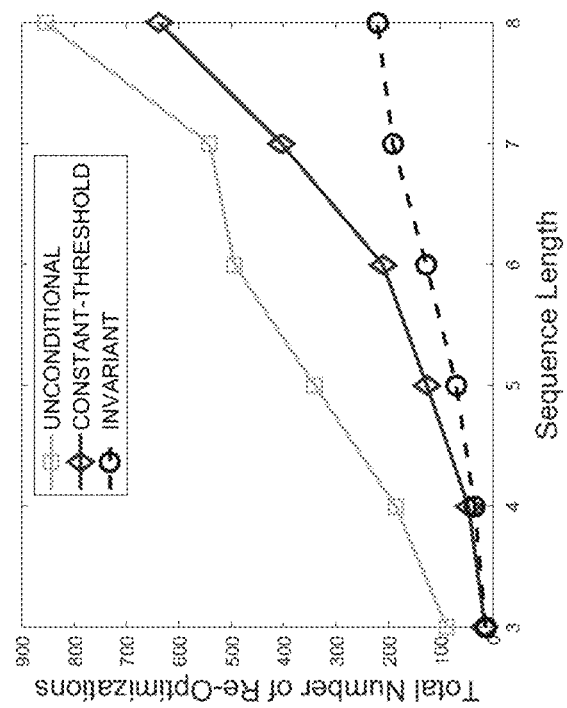
Figure 7E:
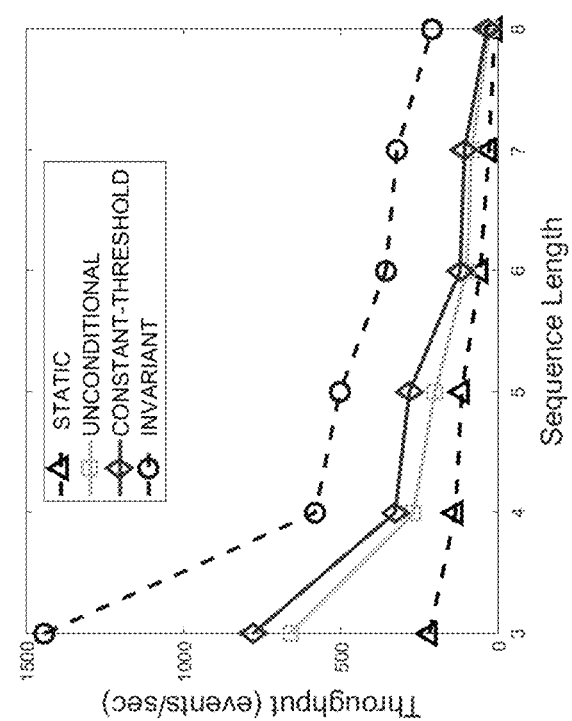
Figure 7F:
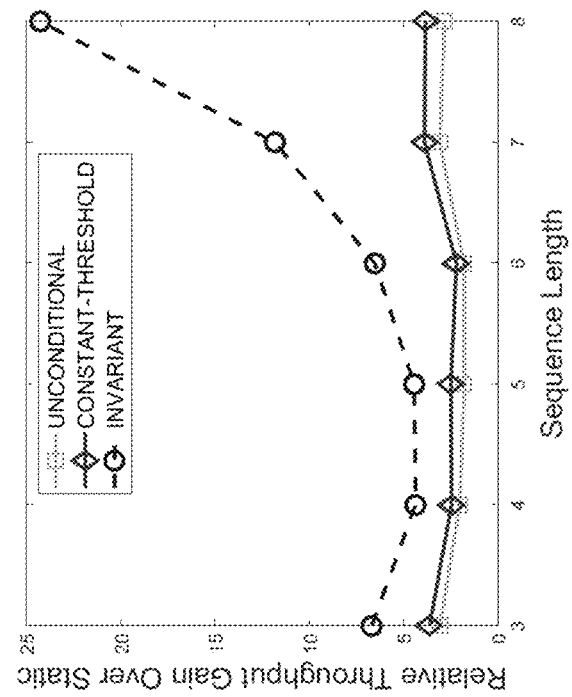
Figure 7G:
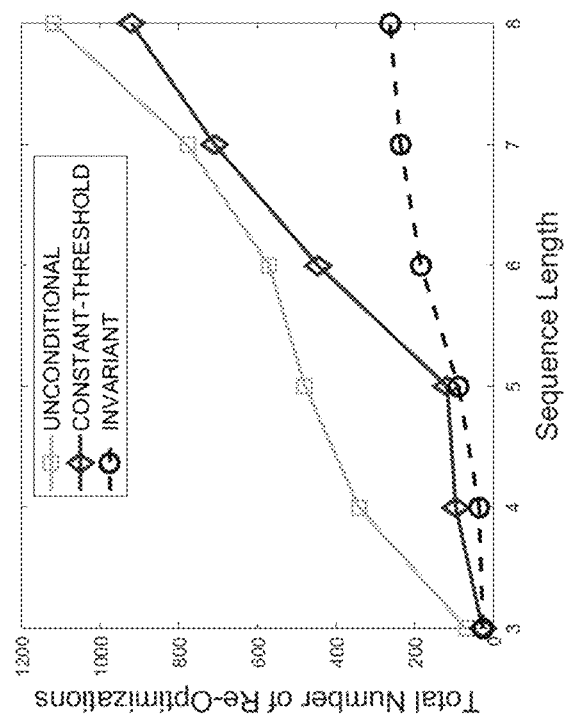
Figure 7H:
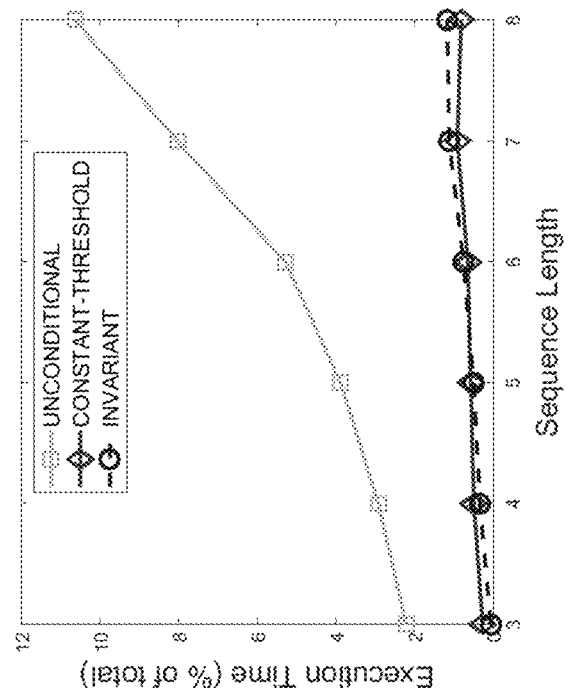
Figure 8B:
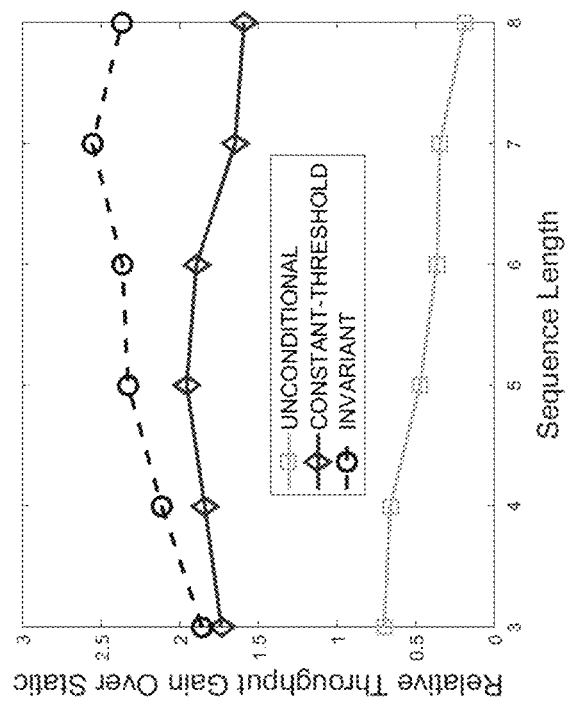
Figure 8A:
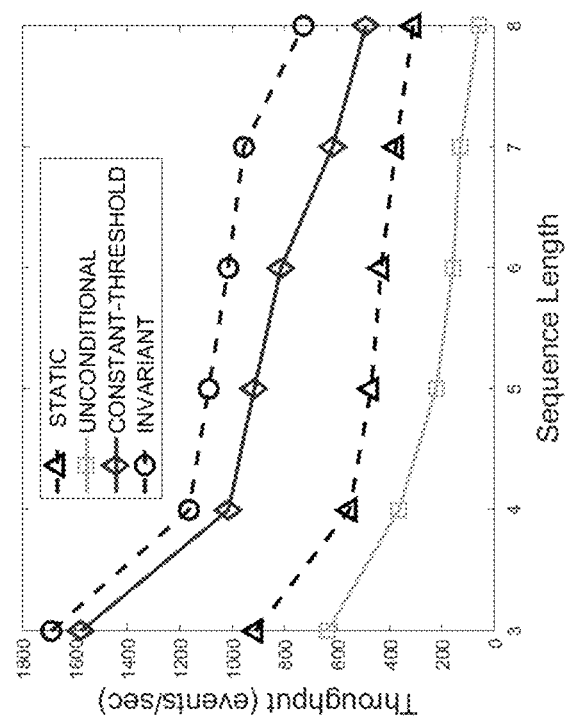
Figure 8D:
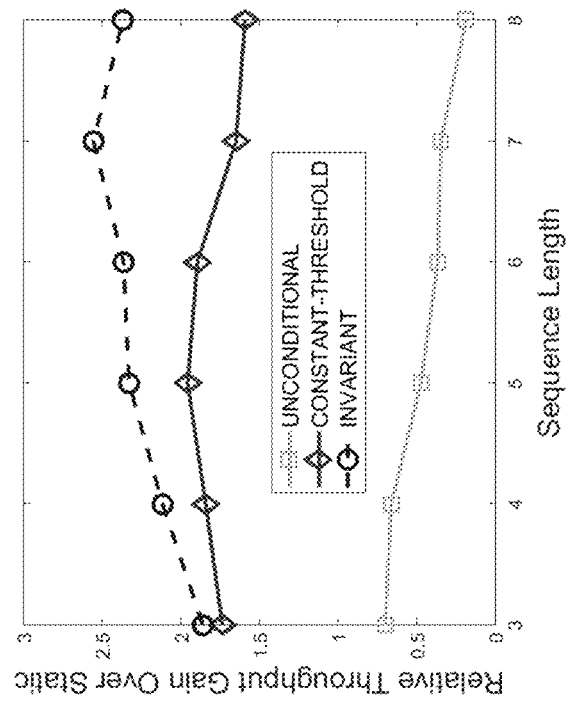
Figure 8C:
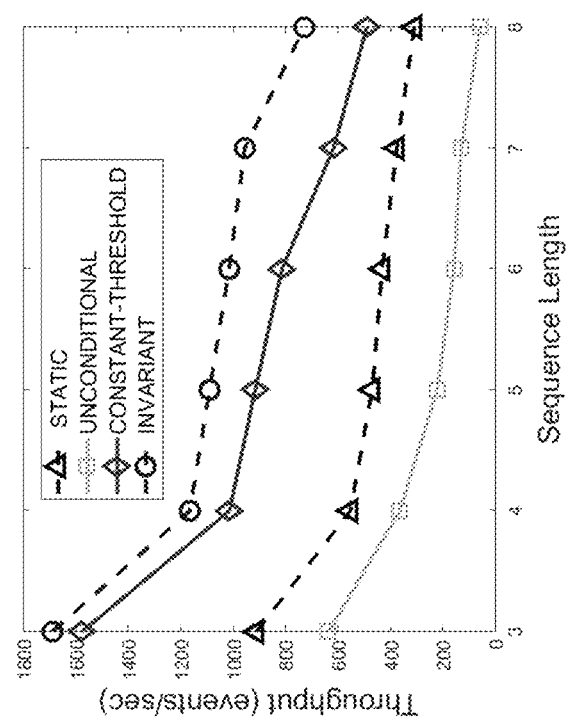
Figure 8F:
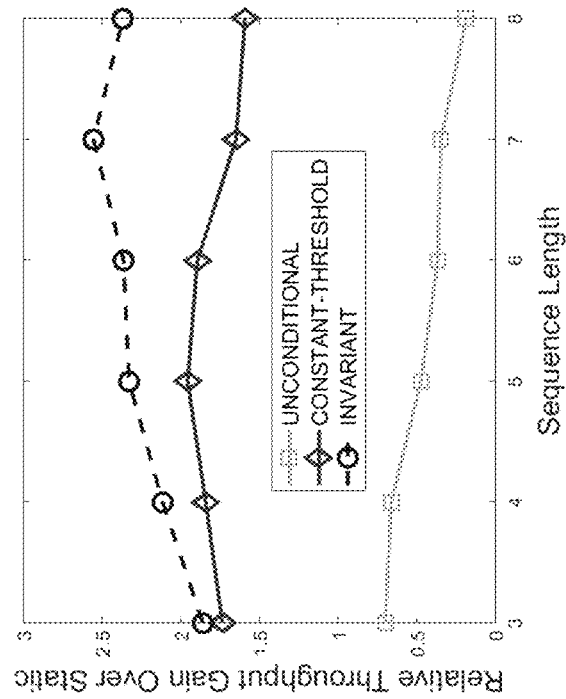
Figure 8E:
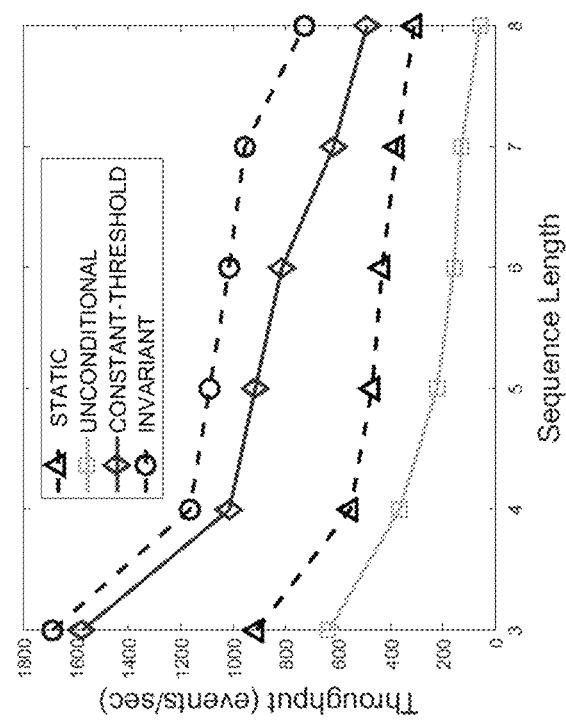
Figure 8H:
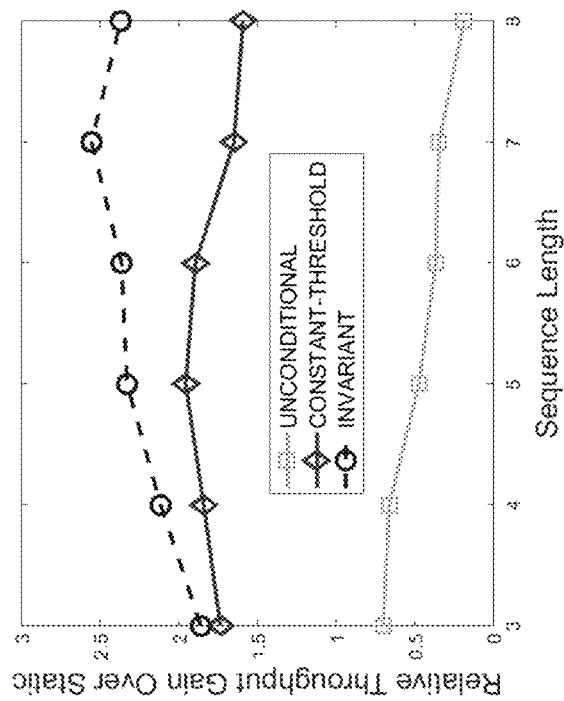
Figure 8G:
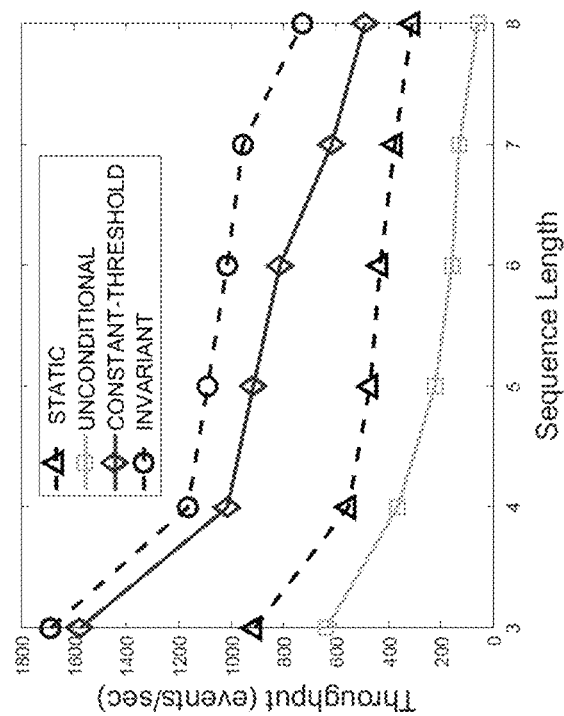

The results are displayed in FIG. 6A (traffic dataset/greedy algorithm), 6B (traffic dataset/ZStream algorithm), 6C (stocks dataset/greedy algorithm), 6D (stocks dataset/ZStream algorithm). It can be observed that in each scenario, there exists an optimal value $d_{opt}$, which depends on the data and the algorithm in use, consistently outperforming the other values for all pattern sizes. For distances higher than $d_{opt}$, too many changes in the statistics are undetected, while the lower values trigger unnecessary adaptations. Overall, the throughput achieved by using invariants with distance $d_{opt}$ is 2 to 25 times higher than that of the basic method (d=0).

Then, the average relative difference method was validated by comparing its output value $d_{avg}$ to $d_{opt}$ (obtained via parameter scanning as described above) for each scenario. For the traffic dataset, the computed values were considerably close to the optimal ones for patterns of length 6 and above, with precision reaching at least 87% (for ZStream algorithm and pattern length 7) and as high as 92% (Greedy algorithm, length 8). For the stocks dataset, the achieved accuracy was only 31-44%. This may be attributed to the low data skew.

Next, an experimental comparison was performed of all previously described adaptation methods. The comparison was executed separately for each dataset-algorithm combination. For the invariant-based method, the $d_{opt}$ values obtained during the first experiment were used. For the constant-threshold method, an optimal threshold $t_{opt}$ was empirically found for each of the above combinations using a similar series of runs.

FIGS. 7A-7H show the comparison results of the adaptation methods applied on the traffic dataset combined with the greedy algorithm (7A-7D) and ZStream algorithm (7E-7H).

Each graph in sets 7A-7D and 7E-7H presents different statistics as a function of the pattern size. The first graph shows the throughput achieved using each of the adaptation methods. Here, there was also included the "static" method, where no adaptation is supported and the dataset is processed using a single, predefined plan. The second graph is a different way of viewing the previous one, comparing the adaptation methods by the relative speedup they achieve over the "static plan" approach. The third graph depicts the total number of reoptimizations (actual plan replacements) recorded during each run. Finally, the computational overhead of each method is reported as a percentage of the total execution time spent on executions of $\mathcal{D}$ and $\mathcal{A}$ (i.e., checking whether a reoptimization is necessary and computing new plans).

The throughput comparison demonstrates the superiority of the invariant-based method over its alternatives for all scenarios. Its biggest performance gain is achieved in the traffic scenario, characterized by high skew and major statistic shifts. This gain reaches its peak for larger patterns, with the maximal recorded performance of more than 6 times that of the second-best constant-threshold method: the greater the discrepancy between the data characteristics, the more difficult it is to find a single threshold to accurately monitor all the changes. Since this discrepancy may only increase as more statistic values are added to the monitored set, it is expected that the superiority of this method to keep growing with the pattern size beyond the values experimented with.

For the stocks dataset (FIGS. 8A-8H), the throughput measurements for the constant-threshold and the invariant-based methods are considerably closer. Due to the near-uniformity of the statistic values and of their variances, finding a single $t_{opt}$ is sufficient to recognize most important changes. Hence, the precision of the constant-threshold method is very high on this input. Nevertheless, the invariant-based method achieves a performance speedup for this dataset as well (albeit only about 30-60%) without adding significant overhead. Also, for the same reason, the static plan performs reasonably well in this scenario, decidedly outperforming the unconditional method. The latter suffers from extreme over-adapting to the numerous small-scale statistic shifts.

The total number of reoptimizations performed in each scenario (FIGS. 7C, 7G, 7C, 8G) backs up and augments the above results. The invariant-based method requires few plan replacements while also achieving the best throughput. The extremely high numbers produced by the unconditional strategy lead to its poor performance. For the traffic dataset, the constant-threshold method tends to approach these numbers for larger patterns. This can either be a sign of multiple false positives or over-adapting. For the stocks dataset, this method is similar to the invariant-based.

FIGS. 7D, 7H, 8D, 8H present the computational overhead of the compared approaches. Here, the same behavior is observed for all dataset-algorithm combinations. While the invariant-based and the constant-threshold methods consume negligible system resources, unconditional reoptimization results in up to 11% of the running time devoted to the adaptation process.

As evident by the experiments with stock market data, smaller number of reoptimizations and lower computational overhead do not necessarily result in better overall system performance. On this dataset, the invariant-based method achieves the highest throughput despite a slightly higher overhead as compared to the second-best constant-threshold method. This can be attributed to the false negatives of the latter, that is, cases in which it missed a reoptimization opportunity and kept using an old plan despite a better one being available.

In all experiments, the relative gain of the invariant-based method was considerably higher for ZStream algorithm than for the greedy one. There are two reasons for this result. First, the more complex structure of the tree-based plans makes it more difficult to capture the dependencies between plan components without fine-grained invariants. Second, as this algorithm is more computationally expensive, the penalty for a redundant reoptimization is higher. Following these observations, it is believed that the invariant-based method is capable of achieving even larger benefit for more advanced and precise (and hence more complex) plan generation algorithms. Utilizing this method will thus encourage the adoption of such algorithms by CEP engines.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

REFERENCES

[1] E. Aarts and J. Lenstra, editors. Local Search in Combinatorial Optimization. John Wiley & Sons, Inc., New York, N.Y., USA, 1st edition, 1997.

[2] D. J. Abadi, Y. Ahmad, M. Balazinska, M. Cherniack, J. Hwang, W. Lindner, A. S. Maskey, E. Rasin, E. Ryvkina, N. Tatbul, Y. Xing, and S. Zdonik. The design of the Borealis stream processing engine. In CIDR, pages 277-289, 2005.

[3] M. Acosta, M. Vidal, T. Lampo, J. Castillo, and E. Ruckhaus. Anapsid: An adaptive query processing engine for sparql endpoints. In International Semantic Web Conference (1), volume 7031, pages 18-34. Springer, 2011.

[4] A. Adi and O. Etzion. Amit—the situation manager. The VLDB Journal, 13(2):177-203, 2004.

[5] J. Agrawal, Y. Diao, D. Gyllstrom, and N. Immerman. Efficient pattern matching over event streams. In Proceedings of the 2008 ACM SIGMOD International Conference on Management of Data, SIGMOD '08, pages 147-160, New York, N.Y., USA, 2008. ACM.

[6] M. Akdere, U. Çetintemel, and N. Tatbul. Plan-based complex event detection across distributed sources. PVLDB, 1(1):66-77, 2008.

[7] M. Ali, F. Gao, and A. Mileo. Citybench: A configurable benchmark to evaluate rsp engines using smart city datasets. In Proceedings of ISWC 2015-14th International Semantic Web Conference, pages 374-389, Bethlehem, Pa., USA, 2015. W3C.

[8] A. Aly, W. Aref, M. Ouzzani, and H. Mahmoud. JISC: adaptive stream processing using just-in-time state completion. In Proceedings of the 17th International Conference on Extending Database Technology, Athens, Greece, Mar. 24-28, 2014, pages 73-84.

[9] L. Amini, H. Andrade, R. Bhagwan, F. Eskesen, R. King, P. Selo, Y. Park, and C. Venkatramani. Spc: A distributed, scalable platform for data mining. In Proceedings of the 4th International Workshop on Data Mining Standards, Services and Platforms, pages 27-37, New York, N.Y., USA, 2006. ACM.

[10] A. Arasu, B. Babcock, S. Babu, J. Cieslewicz, M. Datar, K. Ito, R. Motwani, U. Srivastava, and J. Widom. STREAM: The Stanford Data Stream Management System, pages 317-336. Springer Berlin Heidelberg, Berlin, Heidelberg, 2016.

[11] R. Avnur and J. Hellerstein. Eddies: Continuously adaptive query processing. SIGMOD Rec., 29(2):261-272, May 2000.

[12] B. Babcock, M. Datar, R. Motwani, and L. O'Callaghan. Maintaining variance and k-medians over data stream windows. In Proceedings of the Twenty-second ACM SIGMOD-SIGACT-SIGART Symposium on Principles of Database Systems, pages 234-243, New York, N.Y., USA, 2003. ACM.

[13] S. Babu, P. Bizarro, and D. DeWitt. Proactive re-optimization. In Proceedings of the 2005 ACM SIGMOD International Conference on Management of Data, pages 107-118, New York, N.Y., USA. ACM.

[14] S. Babu, R. Motwani, K. Munagala, I. Nishizawa, and J. Widom. Adaptive ordering of pipelined stream filters. In Proceedings of the 2004 ACM SIGMOD International Conference on Management of Data, pages 407-418, New York, N.Y., USA, 2004. ACM.

[15] S. Babu and J. Widom. Streamon: An adaptive engine for stream query processing. In Proceedings of the 2004 ACM SIGMOD International Conference on Management of Data, pages 931-932, New York, N.Y., USA, 2004. ACM.

[16] R. S. Barga, J. Goldstein, M. H. Ali, and M. Hong. Consistent streaming through time: A vision for event stream processing. In CIDR, pages 363-374, 2007.

[17] P. Bizarro, S. Babu, D. J. DeWitt, and J. Widom. Content-based routing: Different plans for different data. In Proceedings of the 31st International Conference on Very Large Data Bases, Trondheim, Norway, Aug. 30-Sep. 2, 2005, pages 757-768. ACM, 2005.

[18] B. Chandramouli, J. Goldstein, and D. Maier. High-performance dynamic pattern matching over disordered streams. PVLDB, 3(1-2):220-231, 2010.

[19] S. Chandrasekaran, O. Cooper, A. Deshpande, M. J. Franklin, J. M. Hellerstein, W. Hong, S. Krishnamurthy, S. Madden, V. Raman, F. Reiss, and M. A. Shah. Telegraphcq: Continuous dataflow processing for an uncertain world. In CIDR, 2003.

[20] J. Chen, D. J. DeWitt, F. Tian, and Y. Wang. Niagaracq: A scalable continuous query system for internet databases. SIGMOD Rec., 29(2):379-390, 2000.

[21] J. Coffi, C. Marsala, and N. Museux. Adaptive complex event processing for harmful situation detection. Evolving Systems, 3(3):167-177, September 2012.

[22] G. Cugola and A. Margara. Tesla: a formally defined event specification language. In DEBS, pages 50-61. ACM, 2010.

[23] G. Cugola and A. Margara. Complex event processing with T-REX. J. Syst. Softw., 85(8):1709-1728, 2012.

[24] G. Cugola and A. Margara. Processing flows of information: From data stream to complex event processing. ACM Comput. Surv., 44(3):15:1-15:62, 2012.

[25] M. Datar, A. Gionis, P. Indyk, and R. Motwani. Maintaining stream statistics over sliding windows. SIAM J. Comput., 31(6):1794-1813, June 2002.

[26] A. Demers, J. Gehrke, M. Hong, M. Riedewald, and W. White. Towards expressive publish/subscribe systems. In Proceedings of the 10th International Conference on Advances in Database Technology, pages 627-644. Springer-Verlag.

[27] A. Deshpande, Z. Ives, and V. Raman. Adaptive query processing. Foundations and Trends in Databases, 1(1): 1-140, January 2007.

[28] O. Etzion and P. Niblett. Event Processing in Action. Manning Publications Co., 2010.

[29] I. Flouris, N. Giatrakos, A. Deligiannakis, M. Garofalakis, M. Kamp, and M. Mock. Issues in complex event processing: Status and prospects in the big data era. Journal of Systems and Software, 127:217-236, 2017.

[30] Z. Ives, A. Halevy, and D. Weld. Adapting to source properties in processing data integration queries. In Proceedings of the 2004 ACM SIGMOD International Conference on Management of Data, pages 395-406, New York, N.Y., USA, 2004. ACM.

[31] N. Kabra and D. DeWitt. Efficient mid-query re-optimization of sub-optimal query execution plans. SIGMOD Rec., 27(2):106-117, June 1998.

[32] I. Kolchinsky, A. Schuster, and D. Keren. Efficient detection of complex event patterns using lazy chain automata. CoRR, abs/1612.05110, 2016.

[33] I. Kolchinsky and A. Schuster. Efficient adaptive detection of complex event patterns. CoRR, abs/1801.08588, 2017.

[34] I. Kolchinsky and A. Schuster. Join query optimization techniques for complex event processing applications. PVLDB, 11(11):1332-1345, 2018.

[35] I. Kolchinsky, I. Sharfman, and A. Schuster. Lazy evaluation methods for detecting complex events. In DEBS, pages 34-45. ACM, 2015.

[36] J. Kramer, Y. Yang, M. Cammert, B. Seeger, and D. Papadias. Dynamic plan migration for snapshot-equivalent continuous queries in data stream systems. In Proceedings of the 2006 International Conference on Current Trends in Database Technology, pages 497-516, Berlin, Heidelberg, 2006. Springer-Verlag.

[37] O. Lee, E. You, M. Hong, and J. Jung. Adaptive Complex Event Processing Based on Collaborative Rule Mining Engine, pages 430-439. Springer International Publishing, Cham, 2015.

[38] M. Liu, Z. Ives, and B. Loo. Enabling incremental query re-optimization. In Proceedings of the 2016 International Conference on Management of Data, pages 1705-1720, New York, N.Y., USA. ACM.

[39] S. Madden, M. Shah, J. Hellerstein, and V. Raman. Continuously adaptive continuous queries over streams. In Proceedings of the 2002 ACM SIGMOD International Conference on Management of Data, pages 49-60, New York, N.Y., USA, 2002. ACM.

[40] V. Markl, V. Raman, D. Simmen, G. Lohman, H. Pirahesh, and M. Cilimdzic. Robust query processing through progressive optimization. In Proceedings of the 2004 ACM SIGMOD International Conference on Management of Data, pages 659-670, New York, N.Y., USA. ACM.

[41] Y. Mei and S. Madden. ZStream: a cost-based query processor for adaptively detecting composite events. In SIGMOD Conference, pages 193-206. ACM, 2009.

[42] R. Nehme, K. Works, C. Lei, E. Rundensteiner, and E. Bertino. Multi-route query processing and optimization. J. Comput. Syst. Sci., 79(3):312-329, May 2013.

[43] M. Sadoghi and H. Jacobsen. Adaptive parallel compressed event matching. In IEEE 30th International Conference on Data Engineering, 2014, pages 364-375, 2014.

[44] N. P. Schultz-Møller, M. M., and P. R. Pietzuch. Distributed complex event processing with query rewriting. In DEBS. ACM, 2009.

[45] M. Stillger, G. Lohman, V. Markl, and M. Kandil. Leo—db2's learning optimizer. In Proceedings of the 27th International Conference on Very Large Data Bases, pages 19-28, San Francisco, Calif., USA, 2001. Morgan Kaufmann Publishers Inc.

[46] A. Swami. Optimization of large join queries: Combining heuristics and combinatorial techniques. SIGMOD Rec., 18(2):367-376, 1989.

[47] N. Tatbul, U. Çetintemel, S. Zdonik, M. Cherniack, and M. Stonebraker. Load shedding in a data stream manager. In Proceedings of the 29th International Conference on Very Large Data Bases—Volume 29, pages 309-320. VLDB Endowment, 2003.

[48] E. Wu, Y. Diao, and S. Rizvi. High-performance complex event processing over streams. In SIGMOD Conference, pages 407-418. ACM, 2006.

[49] I. Yi, J. G. Lee, and K. Y. Whang. Apam: Adaptive eager-lazy hybrid evaluation of event patterns for low latency. In Proceedings of the 25th ACM Conference on Information and Knowledge Management, pages 2275-2280. ACM, 2016.

[50] H. Zhang, Y. Diao, and N. Immerman. On complexity and optimization of expensive queries in complex event processing. In SIGMOD, pages 217-228, 2014.

[51] Y. Zhu, E. Rundensteiner, and G. Heineman. Dynamic plan migration for continuous queries over data streams. In Proceedings of the 2004 ACM SIGMOD International Conference on Management of Data, pages 431-442, New York, N.Y., USA, 2004. ACM.

[52] http://www.eoddata.com.

[53] http://www.espertech.com.

What is claimed is:

1. A method comprising:
    receiving, as input, a data stream representing events;
    receiving a complex event pattern (CEP) specification representing an occurrence of a CEP in said data stream, wherein said CEP specification comprises (a) a set of conditions associated with relations among said events, and (b) a set of attributes associated with said events;
    continuously updating, from said data stream, current values associated with said set of attributes;
    applying an algorithm to generate, based on said CEP specification and said current values, a current CEP plan configured to determine said occurrence of said CEP in said data stream, wherein said current CEP plan comprises of a series of execution steps; and
    optimizing said current CEP plan by, iteratively:
        (i) executing said current CEP plan,
        (ii) identifying, with respect to each of said execution steps, one of said conditions as an invariant condition whose verification causes said execution step to be included in said current CEP plan,
        (iii) performing a re-verification of all of said invariant conditions using said updated current values; and
        (iv) re-applying said algorithm when said re-verification fails with respect to at least one of said invariant conditions, to generate an updated CEP plan.

2. The method of claim 1, wherein said set of conditions is selected from the group consisting of: a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, and an occurrence of an aggregation of a set of event.

3. The method of claim 1, wherein said CEP is selected from the group consisting of: an occurrence of a single event, an occurrence of a single event under a single condition, an occurrence of multiple events under a single condition, and an occurrence of multiple events under multiple conditions.

4. The method of claim 1, further comprising configuring a CEP engine to initiate an action in response to said determining of said occurrence of said CEP.

5. The method of claim 1, wherein said identifying, with respect to each of said execution steps, comprises:
    (i) identifying a set of all of said conditions whose verification causes said execution step to be included in said current CEP plan; and
    (ii) selecting, from said set, the most tightly bounded condition as said invariant condition.

6. The method of claim 1, wherein said algorithm is one of a greedy heuristic algorithm and a ZStream algorithm.

7. A system comprising:
  at least one hardware processor; and
  a non-transitory computer-readable storage medium having stored thereon program code, the program code executable by the at least one hardware processor to:
    receive, as input, a data stream representing events,
    receive a complex event pattern (CEP) specification representing an occurrence of a CEP in said data stream, wherein said CEP specification comprises (a) a set of conditions associated with relations among said events, and (b) a set of attributes associated with said events,
    continuously update, from said data stream, current values associated with said set of attributes,
    apply an algorithm to generate, based on said CEP specification and said current values, a current CEP plan configured to determine said occurrence of said CEP in said data stream, wherein said current CEP plan comprises of a series of execution steps, and
    optimize said current CEP plan by, iteratively:
      (i) executing said current CEP plan,
      (ii) identifying, with respect to each of said execution steps, one of said conditions as an invariant condition whose verification causes said execution step to be included in said current CEP plan,
      (iii) performing a re-verification of all of said invariant conditions using said updated current values, and
      (iv) re-applying said algorithm when said re-verification fails with respect to at least one of said invariant conditions, to generate an updated CEP plan.

8. The system of claim 7, wherein said set of conditions is selected from the group consisting of: a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, and an occurrence of an aggregation of a set of event.

9. The system of claim 7, wherein said CEP is selected from the group consisting of: an occurrence of a single event, an occurrence of a single event under a single condition, an occurrence of multiple events under a single condition, and an occurrence of multiple events under multiple conditions.

10. The system of claim 7, further comprising configuring a CEP engine to initiate an action in response to said determining of said occurrence of said CEP.

11. The system of claim 7, wherein said identifying, with respect to each of said execution steps, comprises:
  (i) identifying a set of all of said conditions whose verification causes said execution step to be included in said current CEP plan; and
  (ii) selecting, from said set, the most tightly bounded condition as said invariant condition.

12. The system of claim 7, wherein said algorithm is one of a greedy heuristic algorithm and a ZStream algorithm.

13. A computer program product comprising a non-transitory computer-readable storage medium having program code embodied therewith, the program code executable by at least one hardware processor to:
  receive, as input, a data stream representing events;
  receive a complex event pattern (CEP) specification representing an occurrence of a CEP in said data stream, wherein said CEP specification comprises (a) a set of conditions associated with relations among said events, and (b) a set of attributes associated with said events;
  continuously update, from said data stream, current values associated with said set of attributes;
  apply an algorithm to generate, based on said CEP specification and said current values, a current CEP plan configured to determine said occurrence of said CEP in said data stream, wherein said current CEP plan comprises of a series of execution steps; and
  optimize said current CEP plan by, iteratively:
    (i) executing said current CEP plan,
    (ii) identifying, with respect to each of said execution steps, one of said conditions as an invariant condition whose verification causes said execution step to be included in said current CEP plan,
    (iii) performing a re-verification of all of said invariant conditions using said updated current values, and
    (iv) re-applying said algorithm when said re-verification fails with respect to at least one of said invariant conditions, to generate an updated CEP plan.

14. The computer program product of claim 13, wherein said set of conditions is selected from the group consisting of: a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, and an occurrence of an aggregation of a set of event.

15. The computer program product of claim 13, wherein said CEP is selected from the group consisting of: an occurrence of a single event, an occurrence of a single event under a single condition, an occurrence of multiple events under a single condition, and an occurrence of multiple events under multiple conditions.

16. The computer program product of claim 13, further comprising configuring a CEP engine to initiate an action in response to said determining of said occurrence of said CEP.

17. The computer program product of claim 13, wherein said identifying, with respect to each of said execution steps, comprises:
  (i) identifying a set of all of said conditions whose verification causes said execution step to be included in said current CEP plan; and
  (ii) selecting, from said set, the most tightly bounded condition as said invariant condition.

18. The computer program product of claim 13, wherein said algorithm is one of a greedy heuristic algorithm and a ZStream algorithm.

* * * * *